United States Patent
Byrne et al.

(10) Patent No.: US 8,489,792 B2
(45) Date of Patent: Jul. 16, 2013

(54) TRANSACTION PERFORMANCE MONITORING IN A PROCESSOR BUS BRIDGE

(75) Inventors: Richard J. Byrne, Hillsborough, NJ (US); David S. Masters, Schnecksville, PA (US); Steven J. Pollock, Allentown, PA (US); Michael R. Betker, Orefield, PA (US)

(73) Assignee: LSI Corporation, Milpitas, CA (US)

( * ) Notice: Subject to any disclaimer, the term of this patent is extended or adjusted under 35 U.S.C. 154(b) by 296 days.

(21) Appl. No.: 12/979,665

(22) Filed: Dec. 28, 2010

(65) Prior Publication Data

US 2011/0225337 A1   Sep. 15, 2011

Related U.S. Application Data

(60) Provisional application No. 61/313,196, filed on Mar. 12, 2010.

(51) Int. Cl.
  *G06F 13/36* (2006.01)
(52) U.S. Cl.
  USPC .......................................... 710/306; 709/230
(58) Field of Classification Search
  USPC ........................... 710/306, 316–317; 709/230
  See application file for complete search history.

(56) References Cited

U.S. PATENT DOCUMENTS

| | | | |
|---|---|---|---|
| 4,622,631 A | 11/1986 | Frank et al. | |
| 4,805,098 A | 2/1989 | Mills | |
| 5,535,340 A | 7/1996 | Bell et al. | |
| 5,623,698 A | 4/1997 | Stephenson et al. | |
| 5,857,087 A | 1/1999 | Bemanian | |
| 5,892,766 A | 4/1999 | Wicki et al. | |
| 5,943,283 A | 8/1999 | Wong et al. | |
| 5,949,981 A | 9/1999 | Childers | |
| 6,038,630 A | 3/2000 | Foster et al. | |
| 6,195,335 B1 | 2/2001 | Calvignac et al. | |
| 6,275,913 B1 | 8/2001 | Jeddeloh | |
| 6,487,643 B1 | 11/2002 | Khare | |
| 6,557,084 B2 | 4/2003 | Freerksen | |
| 6,567,564 B1 | 5/2003 | van der Wal | |
| 6,636,932 B1 | 10/2003 | Regev et al. | |
| 6,643,747 B2 | 11/2003 | Hammarlund | |
| 6,868,459 B1 | 3/2005 | Stuber | |
| 6,874,052 B1 | 3/2005 | Delmonico | |
| 7,089,346 B2 | 8/2006 | Cebulla et al. | |
| 7,181,556 B2 | 2/2007 | Gwilt | |
| 7,234,018 B1 | 6/2007 | Purcell et al. | |
| 7,461,187 B2 | 12/2008 | Morishita | |
| 7,461,208 B1 | 12/2008 | Caprioli et al. | |
| 7,475,182 B2 | 1/2009 | Matsuse | |
| 7,596,142 B1 | 9/2009 | MacAdam | |

(Continued)

FOREIGN PATENT DOCUMENTS

JP   H02-271444   11/1990

*Primary Examiner* — Clifford Knoll

(57) ABSTRACT

Described embodiments provide a system having a bridge for connecting two different processor buses. A process monitor within the bridge allows for measuring latency of commands issued on a first bus, passing through the bridge, and executed by clients coupled to the second bus. By using identification fields associated with the command, measuring the latency of each command begins with matching the identification field of the command to an integer. As the bridge passes acknowledgements back to the first bus, the monitoring of the command is stopped when an identification field associated with an acknowledgement matches the identification field of the command being monitored. Data collected include the minimum, maximum, total latency, and the number of commands monitored. From this data, the average latency can be easily calculated.

20 Claims, 9 Drawing Sheets

U.S. PATENT DOCUMENTS

| | | |
|---|---|---|
| 7,650,453 B2 | 1/2010 | Torii |
| 7,676,613 B2 | 3/2010 | Bashford |
| 7,778,815 B2 | 8/2010 | Pasricha |
| 7,822,906 B2 | 10/2010 | Fan |
| 7,917,676 B2 | 3/2011 | Sullivan |
| 7,934,046 B2 | 4/2011 | Butter |
| 7,991,928 B2 | 8/2011 | Keller |
| 8,006,021 B1 | 8/2011 | Li |
| 8,041,867 B2 | 10/2011 | Lin |
| 8,171,186 B1 | 5/2012 | Karguth |
| 2002/0029214 A1 | 3/2002 | Yianilos et al. |
| 2002/0165985 A1 | 11/2002 | Chen et al. |
| 2002/0184643 A1 | 12/2002 | Fichet |
| 2003/0033276 A1 | 2/2003 | Cheng et al. |
| 2003/0123468 A1 | 7/2003 | Nong |
| 2003/0200451 A1 | 10/2003 | Evans |
| 2004/0255209 A1 | 12/2004 | Gross |
| 2005/0027920 A1 | 2/2005 | Fitzsimmons et al. |
| 2005/0152352 A1 | 7/2005 | Jun et al. |
| 2006/0256783 A1 | 11/2006 | Ayrapetian et al. |
| 2007/0016756 A1 | 1/2007 | Hsieh et al. |
| 2007/0226798 A1 | 9/2007 | Sibert |
| 2008/0162793 A1 | 7/2008 | Chu et al. |
| 2010/0260198 A1 | 10/2010 | Rojas-Cessa et al. |
| 2011/0055439 A1 | 3/2011 | Chen |

800

TRANSACTION PERFORMANCE MONITORING IN A PROCESSOR BUS BRIDGE

CROSS-REFERENCE TO RELATED APPLICATIONS

This application claims the benefit of the filing date of U.S. provisional application No. 61/313,196 filed 12 Mar. 2010 the teachings of which are incorporated herein in their entireties by reference.

The subject matter of this application is related to U.S. patent application Ser. Nos. 12/430,438 filed 27 Apr. 2009, 12/729,226 filed 22 Mar. 2010, 12/729,231 filed 22 Mar. 2010, U.S. patent application Ser. Nos. 12/782,379, 12/782,393, and 12/782,411, all of which were filed on 18 May 2010, and U.S. patent application Ser. Nos. 12/979,800 and 12/979,551, all of which were filed concurrently with this application, the teachings of all of which are incorporated by reference herein in their entireties.

BACKGROUND OF THE INVENTION

1. Field of the Invention

The present invention relates to processor systems generally and, more specifically, to a local bus bridge for interfacing between different processor bus architectures. In particular, the present invention relates to a method of measuring the performance of the bridge and a subsystem coupled to one of the buses in response to a command issued over the other bus to the bridge.

2. Description of the Related Art

Network processors are generally used for analyzing and processing packet data for routing and switching packets in a variety of applications, such as network surveillance, video transmission, protocol conversion, voice processing, and internet traffic routing. Early types of network processors were based on software-based approaches with general-purpose processors, either singly or in a multi-core implementation, but such software-based approaches are slow. Further, increasing the number of general-purpose processors had diminishing performance improvements, or might actually slow down overall Network Processor throughput. Newer designs add hardware accelerators to offload certain tasks from the general-purpose processors, such as encryption/decryption, packet data inspections, etc.

Because of the complexity of network processors and other system-on-chip (SoC) architectures, there is usually more than one kind of processor bus implemented on the chip, especially if there is a mixture of processor designs on the chip. Generally, one or more processors to communicate with external peripherals, memory, or each other using a processor bus. However, processor buses are not standardized and each processor design utilizes a different, incompatible, bus structure and protocol. Nonetheless, data and addresses need to be passed between buses using a bus "bridge". Because of the incompatibility of the buses, delays and other inefficiencies in the conveyance of data and commands from one bus to the other might be detrimental to operation of the chip as a whole. Thus, it is desirable to provide a bus bridge that efficiently interfaces between two different bus designs.

Because a bridge is needed to provide communication between the two incompatible buses, it is desirable to be able to monitor how well the system operates to identify bottlenecks or other systemic problems that might have a detrimental impact on performance of the system. One approach is to measure the latency or time required for a given command originating on a first bus to pass through the bridge and be executed by a subsystem, e.g., a memory, coupled to the other or second bus. However, there may be multiple commands originating on the first bus that might not be finished at any given time. Hence, a mechanism is needed to reliably identify a command and measure its latency.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide a method of monitoring execution of commands by a subsystem in a system. In response to receiving a command having an identification field associated therewith, the command and the associated identification field are stored in a memory and at least a portion of the received identification field is compared to a non-negative integer value. The stored command is then transmitted to the subsystem for execution. If there is a match between the received identification field and the value, a monitoring process is started for the received command. When the subsystem generates a response, the response having an identification field, the monitoring process is stopped if the response identification field matches the stored identification field.

Alternative embodiments provide a system for monitoring execution of commands by a subsystem comprises a receiver, a memory, a transmitter, a comparison circuit, and a time-based monitoring circuit. The receiver, coupled to a first bus, is adapted to receive a command having an identification field associated therewith. The memory, coupled to the receiver, stores the command and the entire associated identification field. The transmitter, coupled to the memory and a second bus, is adapted to transmit the stored command to the subsystem for execution. The comparison circuit, coupled to the receiver, is adapted to compare at least a portion of the received identification field to a non-negative integer value to thereby determine if there is a match. The time-based monitoring circuit is responsive to the comparison circuit. If there is a match by the comparison circuit, then the monitoring circuit is enabled.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Table 1 defines a list of acronyms employed throughout this specification as an aid to understanding the described embodiments of the present invention:

TABLE 1

| | | | |
|---|---|---|---|
| USB | Universal Serial Bus | FIFO | First-In, First-Out |
| SATA | Serial Advanced Technology Attachment | I/O | Input/Output |
| SCSI | Small Computer System Interface | DDR | Double Data Rate |
| SAS | Serial Attached SCSI | DRAM | Dynamic Random Access Memory |
| PCI-E | Peripheral Component Interconnect Express | MMB | Memory Manager Block |
| SoC | System-on-Chip | MAI | Microprocessor Access Interface |
| AXI | Advanced eXtensible Interface | PLB | Processor Local Bus |
| AMBA | Advanced Microcontroller Bus Architecture | MPP | Modular Packet Processor |
| AWID | Write Request (Address) ID | PPCS | Power PC Component Subsystem |
| FIFO | First-In-First-Out memory | AWADDR | AXI write command data address |
| ARID | Read Request (Address) ID | AWLEN | AXI write command data (burst) length |
| BRESP | Write Response Status | AWSIZE | AXI write command data (burst) size |
| IP | Internet Protocol | CRC | Cyclic Redundancy Check |
| TCP | Transmission Control Protocol | UDP | User Datagram Protocol |
| WID | Write Data ID | RID | Read Response (Data) ID |
| PHC | PLB Hang Detect Control Block | PTC | PLB Timer Control Block |
| PWC | PLB Write Control Block | PRC | PLB Read Control Block |
| PCC | PLB Command Control | AWC | AXI Write Control Block |
| ARC | AXI Read Control Block | WB | Write Buffer |
| RB | Read Buffer | BTAG | WTAG of completing write request |
| A2P | AXI bus-to-PLB | RTAG | Read Request Index Tag |
| BID | Write Response ID | WTAG | Write Request Index Tag |
| DCR | Device Control Block | | |

Figure 1:
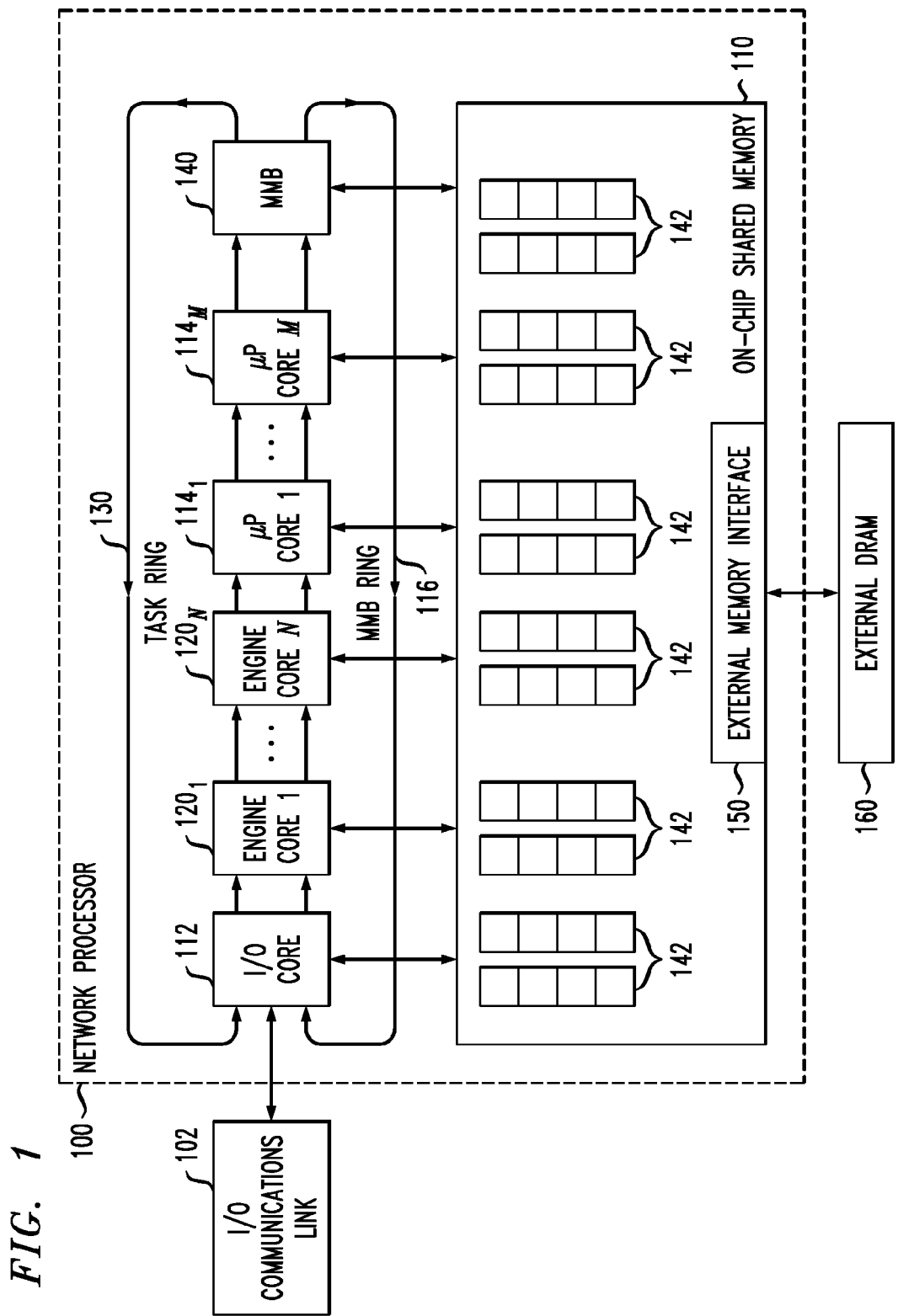
FIG. 1 shows a block diagram of a network communications processor.

FIG. 1 shows a block diagram of an exemplary single-chip network processor system implemented as a system-on-chip (SoC), Network Processor 100. Network Processor 100 might be used for processing data packets, performing protocol conversion, or the like. Reference herein to "one embodiment", "an exemplary embodiment", or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Network processor 100 includes on-chip shared memory 110, one or more input-output (I/O) cores, shown as I/O core 112, one or more microprocessor (µp) cores, shown as µP cores $114_1$-$114_M$, and one or more engine cores $120_1$-$120_N$, where M and N are integers greater than 1. Network Processor 100 also includes task ring 130, memory manager block (MMB) 140, MMB ring 116, and external memory interface 150 for communication with external memory 160. External memory 160 might typically be implemented as a dynamic random-access memory (DRAM), such as a double-data-rate three (DDR-3) DRAM, for off-chip storage of data. In some embodiments, such as shown in FIG. 1, all of the one or more I/O, µP and engine cores, and MMB 140, are directly coupled to shared memory 110. In alternative embodiments, each of the one or more I/O, µP and engine cores, and MMB 140 might not need to be directly coupled to shared memory 110. For example, as described in greater detail with regard to FIG. 2, each of the one or more I/O, µP and engine cores, and MMB 140 (collectively referred to as "cores") might be coupled to a switch system that is then coupled to shared memory 110.

Shared memory 110 might include one or more FIFO queues 142. As discussed in more detail below, one or more FIFO queues 142 might be dynamically allocated in shared memory 110 to the various cores 112, 114, and 120 based on corresponding requests by the cores to MMB 140. Each core might request allocation of memory for additional FIFO queues via MMB ring 116. While, in FIG. 1, task ring 130 and MMB ring 116 are shown coupled to the various cores in an order, one skilled in the art will realize that such order is for illustrative purposes only as an aid to describing the present invention, and any one of the cores might be adjacent to another core along rings 130 and 116. As described herein, the term "adjacent" describes either a previous core or subsequent core on communication rings 116 and 130. For example, in the exemplary embodiment shown in FIG. 1, MMB 140 is adjacent to µP core $114_M$ and I/O core 112.

I/O core 112 might typically be implemented as hardware that connects Network Processor 100 to one or more external devices through I/O Communication link 102. I/O Communication link 102 might generally be employed for communication with one or more external devices, such as a computer system or networking device, that interface with Network Processor 100. I/O Communication link 102 might be a custom-designed communication link, or might conform to a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, a Serial Rapid I/O ("SRIO") link, or any other interface link.

Received packets are preferably placed in memory 110 and then one or more "tasks" corresponding to the received packets are provided, via task communication ring 130, to one or more of the various cores. As described herein, a task is a command issued between cores to perform processing functions on at least a portion of packet data. Transmitted packets are preferably received from a task and transmitted externally.

Task ring 130 is a communication bus linking adjacent cores together in a serial or "daisy-chain" fashion. In one embodiment, task ring 130 might be a unidirectional ring that passes task control information from a source core to a destination core, and the tasks might contain address pointers to data stored in shared memory 110. As described herein, tasks are instructions to the destination core to perform certain functions. Tasks received by a destination core might be stored in a corresponding one of FIFO queues 142, and the data corresponding to the task to be processed by the destination core might be stored in shared memory 110.

Tasks allow Network Processor 100 to process a wide variety of data and control messages more efficiently than network processors with a fixed pipeline or non-pipelined architecture. As discussed in more detail in the incorporated patent applications, the sequence of the tasks depends on i) the type of packet and ii) the type of processing performed by the various cores on a particular packet (or group of packets), control message, or other data. This is referred to herein as a "Virtual Pipeline™", a trademark of LSI Corporation, of Milpitas, Calif.

In embodiments of the present invention, a virtual pipeline operates by each core receiving a task, executing that task, and assigning a subsequent task to another (or the same) core depending on the packet or instruction being processed. For purposes here, a core generating a task is referred to as a source core, and a core given a task to execute is referred to as a destination core. Tasks provided to a destination core are written to shared memory 110 by the source core and read from shared memory 110 by the destination core. Task ring 130 provides a communication path for the various cores to pass tasks to each other utilizing messages that contain the address pointers to data corresponding to the task stored in shared memory 110. Although shown in FIG. 1 as a ring bus, it is understood that other topologies other than a ring might be used to pass tasks from core to core, such as direct connections between each of the cores or use of a switch system. As described below, a task data structure might typically include i) an identification of a virtual pipeline for the task, ii) packet specific parameters and engine instructions for the virtual pipeline, iii) inline header and trailer data for the task, and iv) pointers to data stored in memory 110.

External memory interface 150 couples shared memory 110 to external DRAM 160 to provide off-chip storage of data not needed by the various engine cores $120_1$-$120_N$ and μP cores $114_1$-$114_M$ to free space in shared memory 110. Memory management block (MMB) 140 allocates and frees memory resources in shared memory 110. Memory is allocated for such applications as task FIFO storage (e.g., FIFOs 142), packet data storage, hash-table collision handling, timer event management, and traffic manager queues. MMB 140 provides reference counts to each block of memory within shared memory 110. Multiple reference counts allow for more efficient storage of information, such as multicast traffic (data to be sent to multiple destinations) or for retransmission. Multiple reference counts remove the need for replicating the data each time the data is needed. MMB 140 preferably tracks the memory allocations using a stack-based approach since a memory block recently released is preferably the next block to be allocated for a particular task, reducing cache trashing and cache tracking overhead.

Figure 2:
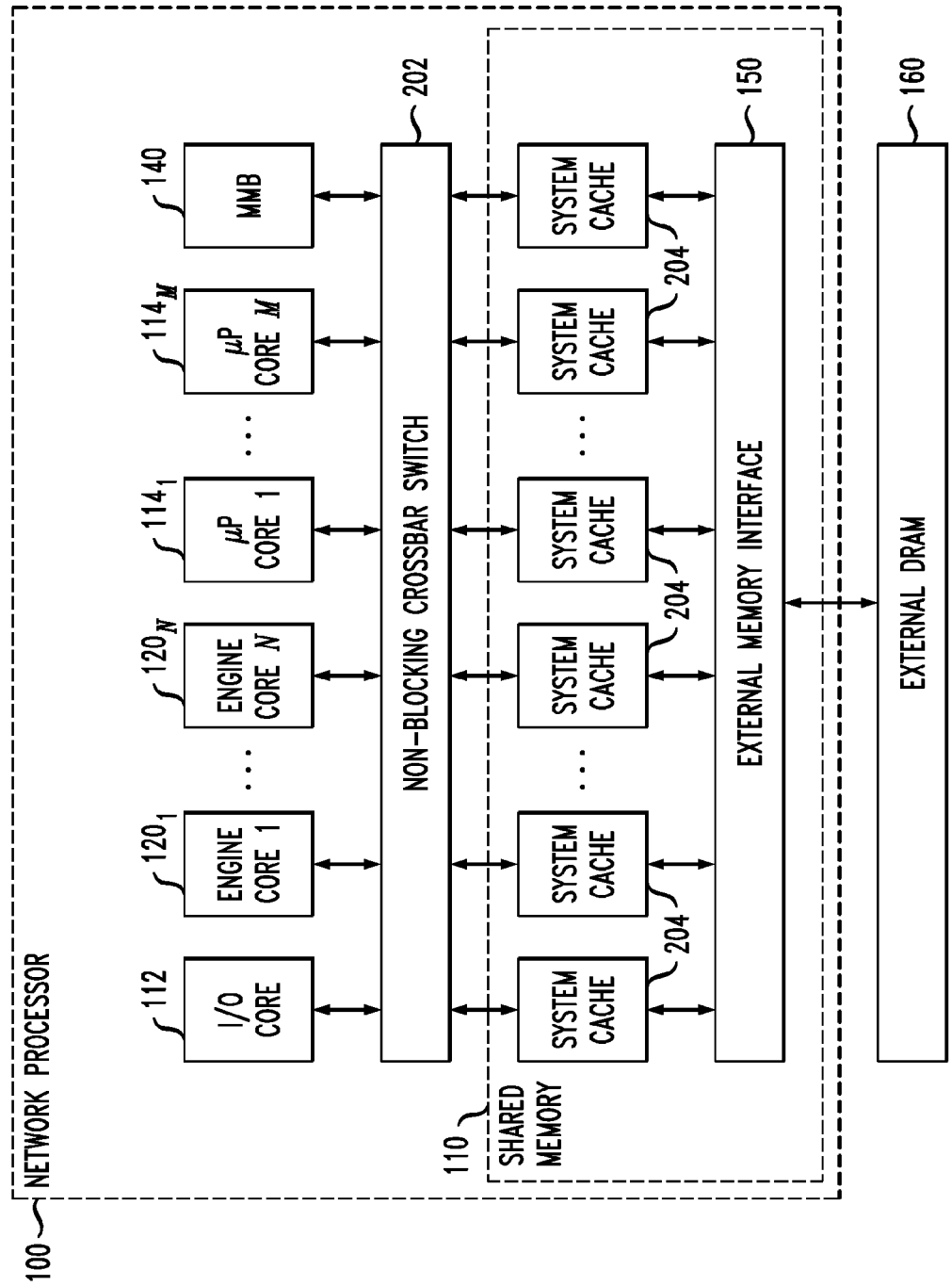
FIG. 2 shows a block diagram of the network communications processor of FIG. 1 with additional details.

FIG. 2 is a simplified diagram of the Network Processor 100 of FIG. 1 with additional details. Like-numbered items perform analogously with those described with respect to FIG. 1 and are not discussed herein in connection with FIG. 2 except as noted. Non-blocking crossbar switch 202 connects cores 112, $120_1$-$120_N$, $114_1$-$114_M$ and MMB 140 to system caches 204 in shared memory 110, and a connection made through non-blocking crossbar switch 202 is considered, for purposes here, a direct connection between a core and the memory 110. Crossbar switch 202 is preferably a non-blocking switch arbitrating memory access priority by the cores. As described in more detail below, system caches 204 are addressed via the crossbar switch in such a way as to balance access to the caches, referred to herein as striping, helping to avoid hot spots in shared memory 110, improve performance of the caching in and out of external memory 160, and reduce cache access bottlenecks. Thus, in embodiments of the present invention, each system cache 204 might form a memory array, and the number of system caches might preferably be implemented as a power of two. Non-blocking crossbar switch 202 might be implemented such as described in the above-identified related U.S. patent application Ser. Nos. 12/430,438 filed 27 Apr. 2009, 12/729,226 filed 22 Mar. 2010, and 12/729,231 filed 22 Mar. 2010.

In embodiments of the present invention, there are three types of "clients" (e.g., types of cores) supported by the crossbar: i) processor cores, ii) I/O cores, and iii) general clients. Processor cores $114_1$-$114_M$ access the system cache via the crossbar and have generally absolute priority to reduce to a minimum latency for the processors that might otherwise suffer from stall cycles when latency increases beyond a threshold.

I/O cores are a type of client that support I/O interfaces, such as I/O core 112, and have medium memory access priority. Allocation of this priority level is important because these types of clients might suffer from underrun/overrun issues when supporting their interfaces. The I/O core clients generally experience higher latency than general processor cores, but lower latency than general clients. However, since the I/O function is generally easy to read-ahead and write-behind, this higher latency for these types of clients causes little or no impact to overall performance. If the maximum latency is bounded, the size of the read-ahead and write-behind required might be determined.

Figure 3:
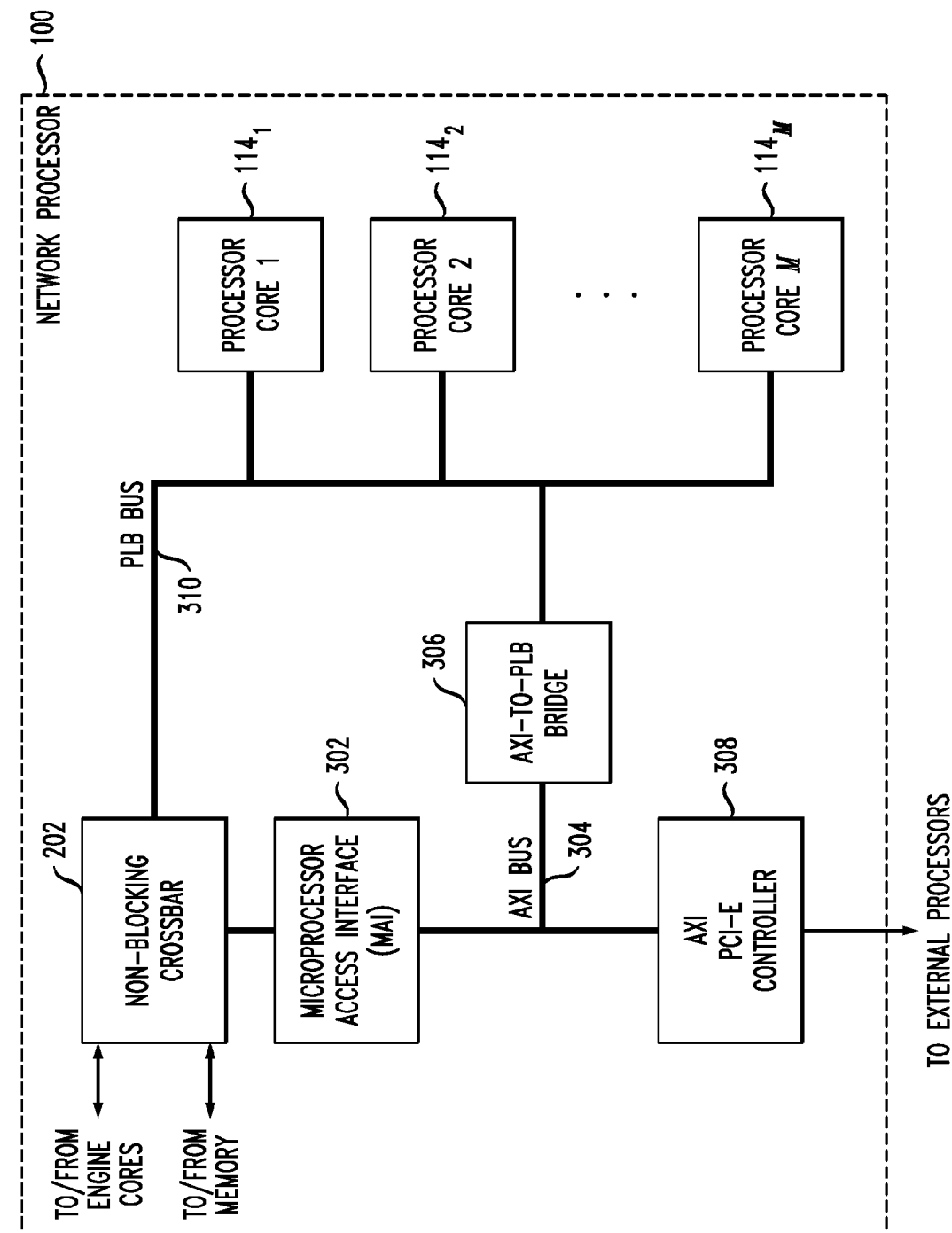
FIG. 3 shows a block diagram of an exemplary communication bus of the network communications processor of FIG. 2.

General clients have the lowest access priority for shared memory 110. General clients might constitute all other modules of Network Processor 100. For example, these modules might be hardware accelerators or special purpose processors. One such special purpose processor, shown in FIG. 3, is Microprocessor Access Interface (MAI) 302. As shown in FIG. 3, MAI 302 might provide a physical bus interface to enable virtual pipeline connections between one or more internal and external processors and non-blocking crossbar switch 202. All general client functions are designed to be tolerant of the memory latency and can tolerate short disruptions in latency without causing performance issues.

MAI 302 is generally performance insensitive to absolute latency. Thus, MAI 302 is typically operated with high utilization at the lowest possible priority value. The I/O core clients are sensitive to memory access latency, but only to having predictable latency. If the memory access latency is bounded, prefetch and write behind might be employed to operate without underrun or overrun. In general, all other memory clients are sensitive only to average latency. In addition, they might prefetch and write-behind to achieve a desired level of performance.

FIG. 3 shows a block diagram detailing an interface 300 between processors $114_1$-$114_M$ and crossbar switch 202 and external processors or other off-chip peripherals. As shown, Network Processor 100 contains one or more microprocessors $114_1$-$114_M$, each of which might include internal L1/L2 caches (not shown). The multiple processors implement cache coherency between themselves as is well known in the art. Cache misses from the processors go across the main system memory crossbar 202 to on-chip shared memory 110 and, if necessary, external memory 160. Interface 300 might also include a standard set of peripheral interfaces (USB, EEPROM, etc., not shown) on or off the chip. For example, as shown in FIG. 3, PCI-E interface 308 might be provided. PCI-E interface 308 allows for any external device operating in conformance with the PCI-E protocol to be attached to Network Processor 100. For example, PCI-E interface 308 might allow one or more external processors to access shared memory 110, task queues 142 and other resources on the chip, such as task ring 130 and MMB ring 116. Thus, the task communication mechanism employed by the internal processors can also be used for message passing between the internal and external processors.

Communication between processors $114_1$-$114_M$ and memory 110 via crossbar switch 202 occurs via two paths, one path for processor instructions requiring latency less than a predefined threshold ("minimal latency") and the other path for other types of information, such as tasks sent via the virtual pipeline, that are not as sensitive to memory latency. Memory access interface (MAI) 302 handles instructions that are less sensitive to memory latency. MAI 302 is an interface between crossbar switch 202 (and memory 110) and the internal processor(s) $114_1$-$114_M$ and any attached processor(s) external to Network Processor 100. MAI 302 provides an interface for different kinds of microprocessors to receive and send tasks like any of the internal cores coupled to shared memory 110.

For example, MAI 302 might be coupled to PCI-E interface 308. As illustrated here, MAI 302 connects to the crossbar 202 for its task-based communications. For processor communications, MAI 302 is coupled to AXI bus 304. The AXI protocol is a higher frequency implementation of the Advanced Microcontroller Bus Architecture (AMBA) introduced by ARM Ltd. A complete explanation of the AMBA architecture and the AXI bus operation can be found in "AMBA AXI Protocol Specification", copyright 2003, 2004, ARM Limited, the contents of which are incorporated herein in its entirety. AXI bus 304 enables MAI 302 to communicate with any peripheral device or processor that supports the AXI protocol. AXI-to-PCI-E controller 308 might be used by MAI 302 to allow external processors to access AXI bus 304. Internal processors $114_1$-$114_M$ access AXI bus 304 via AXI-to-PLB Bridge 306. PLB is a proprietary microprocessor bus architecture introduced by IBM. In embodiments of the present invention, processors $114_1$-$114_M$ are Power PC® processors that utilize PLB 310 for communication between processors and crossbar 202. AXI-to-PLB (A2P) bridge 306 allows processors $114_1$-$114_M$ to communicate with AXI bus 304, and thus external processors (via AXI-to-PCI-E controller 308).

For purposes here and as used herein, the AXI bus and PLB are internal system buses hierarchically comprised of subcomponents. For the AXI, the next lower layer of bus hierarchy is referred to as a "channel" or "path". For the PLB, the next lower layer of bus hierarchy is sometimes referred to as an interface, but for purposes here, the term "channel" or "path" is used here as well.

MAI 302, AXI-to-PCI-E controller 308 and AXI-to-PLB Bridge 306 make the architectural design of Network Processor 100 "agnostic" to the chosen processor architecture for processors $114_1$-$114_M$ or any external processors. For example, a given design might employ Pentium® or Power PC® processors, or a combination of different processors, without changing the interfaces to various software modules of Network Processor 100. Pentium® is a registered trademark of Intel Corporation, and Power PC® is a registered trademark of IBM.

As mentioned above, task communication within the architecture of Network Processor 100 is handled by MAI 302. MAI 302 allows the processors to send and receive tasks to and from other processors or other cores within the architecture. MAI 302 is also used for configuration updates. All accesses that MAI 302 makes to memory 110 are fully coherent with the processor receiving or issuing a task. If an external processor supports I/O coherency for PCI-E transactions, then the external processors are coherent as well. All interactions with MAI 302 are preferably non-blocking to the processor and generally involve only local memory updates. Processor overhead is reduced to a few cached memory accesses (no I/O cycles required). Advantageously, MAI 302 allows the programming model might be substantially the same for internal and external CPUs. The programming model might also be substantially the same for special purpose processors, such as digital signal processors.

Multiple task queues (e.g., FIFOs 142 of FIG. 1) for each processor are supported for input, output, and processor configuration. This allows independent access to the queues from different processors or cores. An ordered queue process can be used to provide per flow load balancing among the cores. Tasks can also be directed to a specific queue.

One component of MAI 302 manages processor addressable FIFO buffers. For outgoing tasks, MAI 302 will copy the data out of the processor-specified buffer quickly. Therefore, the processor will be able to reuse the buffers quickly. The task queues going towards the CPUs can also be quite shallow, for example, the queues might only be deep enough for MAI 302 to have sufficient time to push a next task in to the buffer. Buffer management for task-receive queues, explained in more detail below, is handled by the processor providing MAI 302 with a small set of buffer addresses. This approach might require an extra copy of the data being buffered, but this copy might have only a small performance impact because of the aggregate bandwidth provided by the memory subsystem and the intelligent management of the cache. No extra external memory access cycles will be required for this copy.

Figure 4:
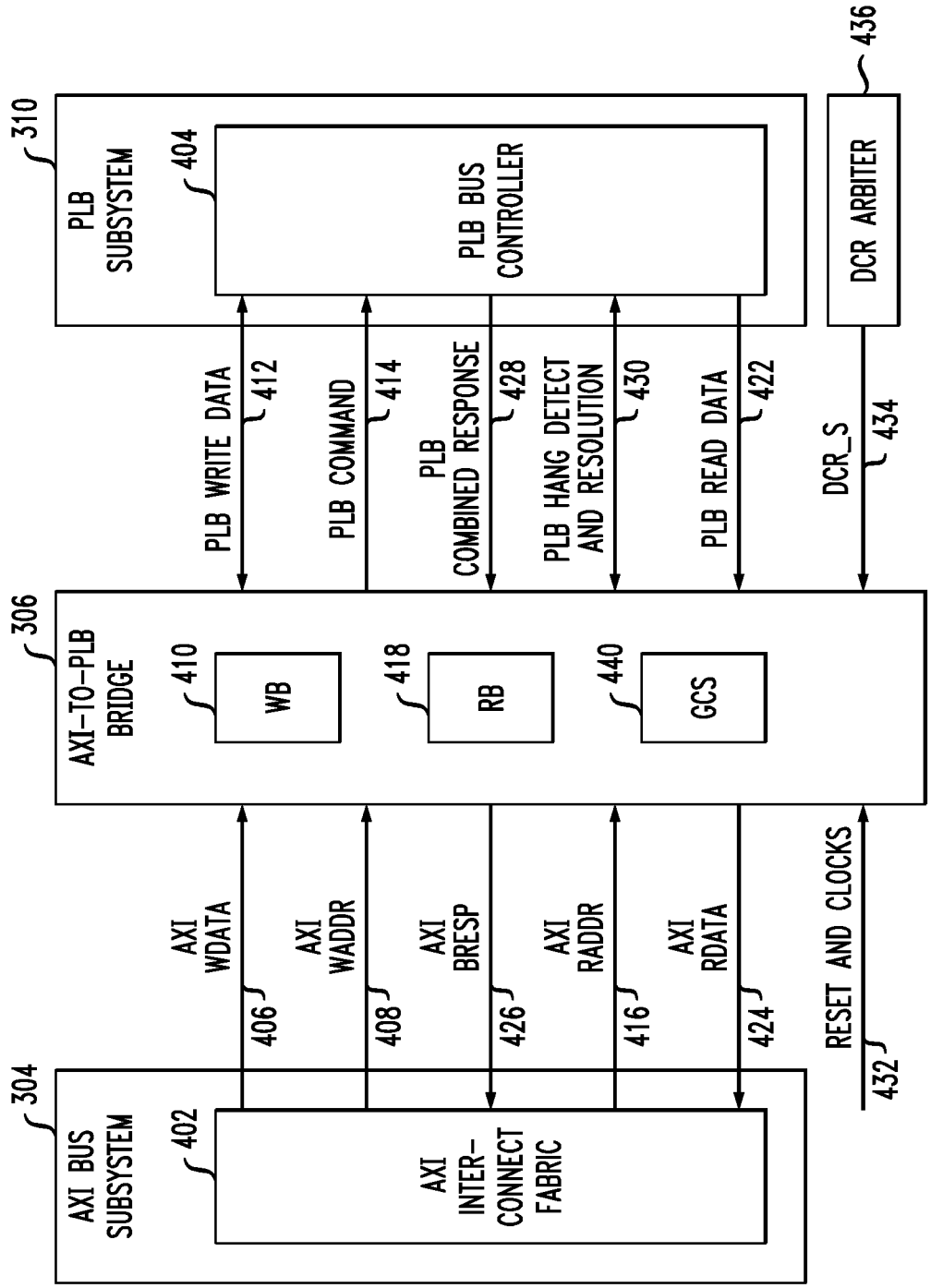
FIG. 4 shows a simplified interface diagram of the AXI-to-PLB bridge of the network communications processor of FIG. 3.

Turning to FIG. 4, an AXI bus-to-PLB (A2P) top-level interface diagram is shown to provide details regarding signal flow between the AXI bus 304 and PLB 310 and a brief description of the purpose of various buses between the AXI bus 304 and the bridge 306, as well as between PLB 310 and the bridge 306. The AXI bus is a subsystem 304 having an interconnect fabric 402 for passing information from and to AXI bus clients such as those shown in FIG. 3. Further details on the interconnect fabric 402 can be found in the aforementioned AXI Protocol Specification. Similarly, the PLB 310 is a subsystem having a PLB controller 404, a proprietary SoC IP block instantiated within the Power PC Component Subsystem (PPCS) available from IBM. The bus controller 404 arbitrates address and command information, along with data read from the PLB, passing through the controller 404. In this embodiment and as will be described in more detail below, write requests originating from the AXI bus 304 are transmitted to the bridge 306 via AXI WADDR channel 408 and write data over AXI WDATA channel 406 and are assembled in the Write Buffer block (WB) 410. Data to be written, stored in WB 410, is sent to the PLB controller via channel 412 and the write address over channel 414. Read requests over AXI RADDR channel 416 originating from the AXI bus 304 are assembled in the read buffer block (RB) 418 and sent to the PLB controller over channel 414. In response, data from the PLB 310 are received over channel 422, assembled in the RB 418, and sent to the AXI bus via channel 424. Details regarding the channels can be found in the aforementioned AXI Protocol Specification. For purposes here, the AXI system bus protocol is burst based. Every transaction has address and control information on either channel 408 or 416 that describes the nature of the request for data to be transferred. The control information includes the number of beats of a burst and the size in bits of the beats. Also included are request IDs to individualize requests and provide a means for identifying the data transfer and request culminating response phases that are to be correlated with such particular request.

But the Data transfer phases also include control information. Each beat of channel 406 write data is accompanied by write strobe information as well as the write data ID and last status. Each beat of read data 416 is accompanied by read response status, a read data ID and a last beat flag. If a write is to occur, then write data from the AXI bus is provided over channel 406 and, in turn, to the PLB over channel 412. When a read request is executed, data from the PLB over channel 422 is passed to the AXI bus over channel 424. Channel 426 is used to convey the write response status of AXI control signals described in section 2.4 of the above-referenced AMBA AXI Protocol Specification.

Only the first and last beats of a data burst may be less than a quad-word on the PLB subsystem 310. The PLB command's address is adjusted if the leading bytes of a quad-word are not to be requested as part of the first beat. The PLB command's byte enable indicates which bytes are to be used for the last beat of the burst.

However, the AXI bus 304 allows bursts using various sizes with either quad-word or smaller than quad-word beats. Thus the bridge 306 will have to perform byte lane reordering and beat transfer size transformations for both read and write transfers. In some cases this will also require splitting of some of these AXI transfers into multiple PLB transfers because the AXI burst length can exceed the maximum PLB burst length. For write transfers, the byte count is not known until the last beat of the transfer is received from the AXI bus. Splitting of PLB commands may be necessary to prevent commands from crossing PLB 128 byte boundaries.

On the PLB side of the bridge 306, channel 428 conveys the status of various requests sent to controller 404, such as read and write requests, sent over channel 414 to PLB controller 404 in response to AXI bus-initiated read and write requests. Bidirectional channel 430 handles hang detection and resolution. It provides a means for the bridge 306 to assert that it is not making forward progress with commands to the PLB. The bridge 306 maintains per WTAG and RTAG progress counters in sub-block 534, described in more detail below, that increment in response to a PLB system count increment pulse when the bridge 306 has outstanding AXI requests. Channel 430 also provides a control signal that bridge 306 monitors and, when that control signal is asserted, the bridge 306 will not issue any new commands via PLB command channel 414, with the exception of the case where the bridge 306 is asserting that it is in the hung state it may re-issue commands that have been previously issued for which a combined response of retry was received. Channel 428 conveys the combined response of the PLB slaves to the bridge 306 to issued PLB read and write commands. The combined response can be any one of acknowledge, retry, or error. The slave-tag and slave-ID are provided to the bridge 306 to allow the bridge 306 to identify each beat of write data onto the channel 412 during writing of data from the bridge 306 to the bus controller 404.

The slave tag is given to a PLB master as part of the combined response on channel 428 to a write command. The slave tag originates in the slave targeted by the master and is passed through the PLB Bus Controller 404 to the bridge 306. The bridge 306 provides the slave tag along with the data in the PLB write data transfer phase. This allows the target PLB slave to match the transferred data with the earlier command. The slave ID is given to the master as part of the combined response 428 to a write command. This slave ID originates in the PLB controller 404. The bridge 306 provides this slave ID along with the data in the PLB write data phase, so that the PLB controller 404 can route the write data to the correct target slave.

Reset signals and various clocks for the bridge 306 are present on channel 432. Control, configuration, and other data are carried over channel 434 from and to Device Control Register (DCR) arbiter 436, part of the PLB structure. The arbiter 436 arbitrates access of the DCR masters to the DCR bus slaves of which the bridge 306 is a DCR slave. Internal configuration and status registers in the bridge 306 are accessible by DCR masters.

In this exemplary embodiment, the bridge 306 is an AXI bus "slave" and a PLB "master", i.e., bridge 306 does not initiate operations on the AXI bus 304 but does initiate operations on the PLB 310. It is understood that the bridge 306 may be an AXI bus master and a PLB slave or a master on both buses.

Upon reset of the Network Processor 100 (FIG. 1), all internal state machines, control registers, data registers, and FIFO memories are cleared in the bridge 306. Following reset, the bridge 306 should be in an operational configuration, but the General Control and Status registers (GCS) 440 may be modified over the Device Control Register Slave channel (DCR_S) 434 to reconfigure the bridge 306.

Figure 5:
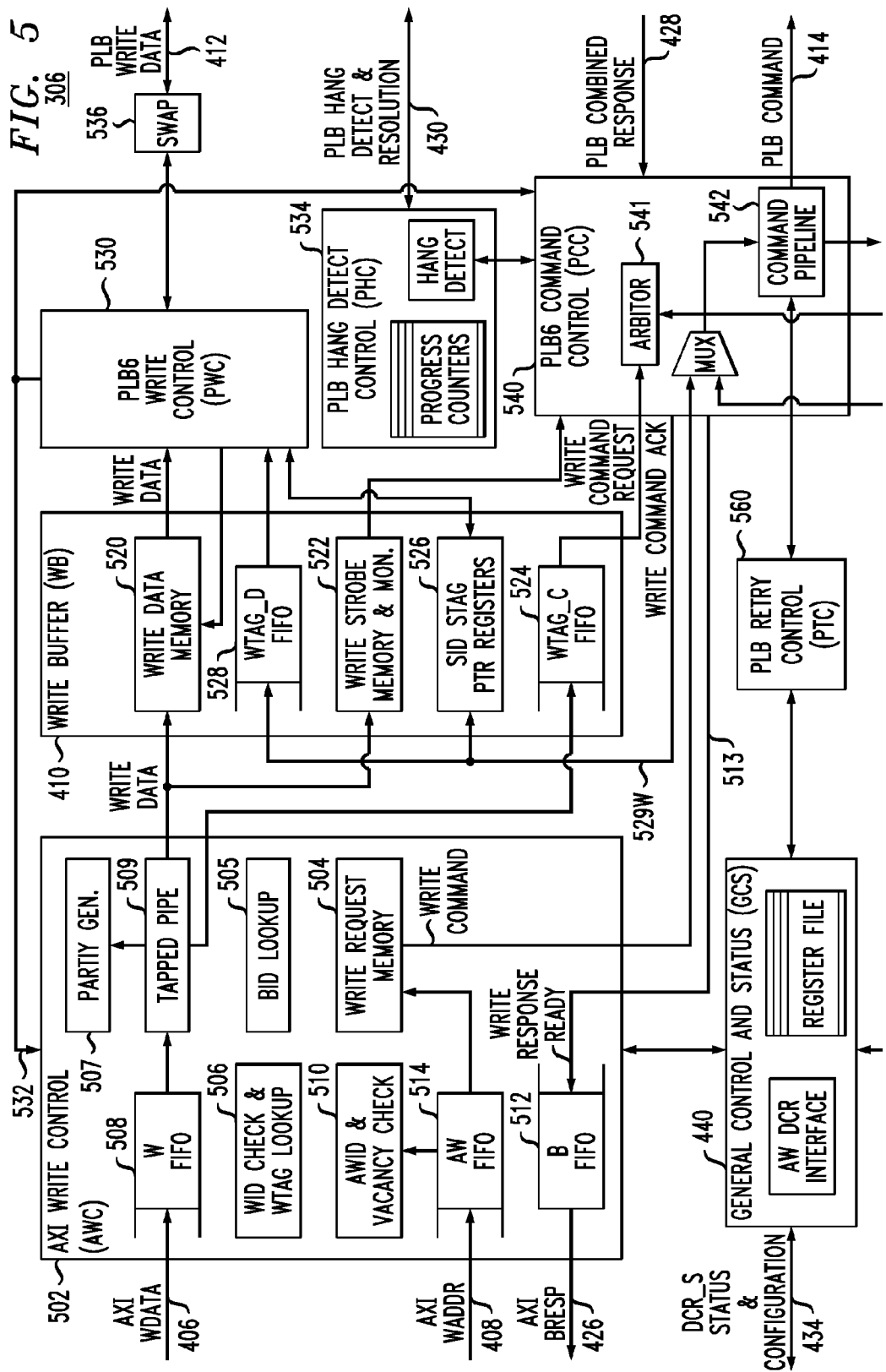
FIG. 5 illustrates the AXI-to-PLB bridge of FIG. 4 in more detail and in accordance with embodiments of the present invention.
Figure 5:
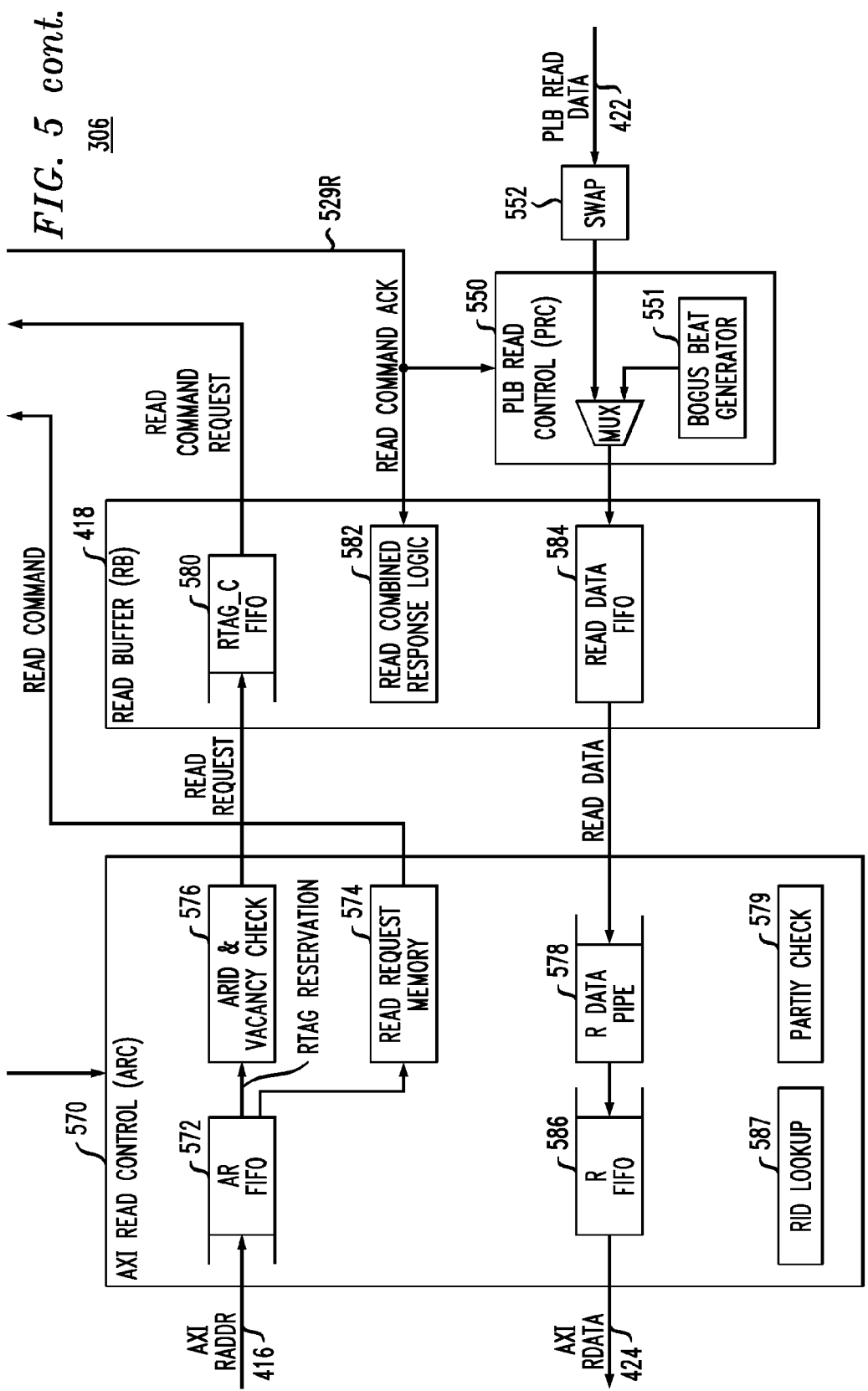

FIG. 5 illustrates the bridge 306 in more detail. The functions of the various blocks in the bridge 306 are described herein.

The AXI Write Control (AWC) block 502 interfaces to the AXI slave write channels 406, 408, 426, to accept write requests (commands), write address and write data from the AXI bus 304, and communicates write channel responses to the AXI BRESP 426. For purposes here and as used herein, the terms "commands" and "requests" are used interchangeably. As explained in more detail below, the AW, W, and B FIFOs in AWC 502 provide clock domain crossing, rate adaptation, and some buffering for the WADDR (408), WDATA (406), and BRESP (426) write channels. The Write Request Memory 504 stores AXI Write Channel requests by entries indexed by WTAG indexes from the AWID block 510, described below. The memory 504 is may be implemented as a group of register bit, vector, and counter arrays and is a memory indexed, in this embodiment, with values ranging from zero to fifteen. Thus the memory 504 is divided into sixteen portions. Each portion represents a potential write request traffic context comprising an AXI write request from bus 408, the beats of write data and write strobe information from bus 406, the status and progress of the request. Different requests can simultaneously proceed through various pipeline states from clock cycle to clock cycle. As will be explained in more detail in connection with FIG. 6, when a new write request is presented to the AWC 502, the vacancy status of the write request memory 504 is checked for a free WTAG index, and for the new command's write address (AWADDR) and AWID, one portion identifying the AXI maser, the other portion used by the AXI master to distinguish one of its requests from another having been already present. If the AWID is already present, or if there are no free WTAG indexes, the request must wait in the AW FIFO for the corresponding WTAG entry to be de-allocated.

Otherwise, having passed the admissibility check in AWID block 510 operating upon contents of memory 504, as described below in connection with FIG. 6, the candidate request in FIFO 514 will be admitted and its corresponding request information stored in memory 504.

If WID check and WTAG lookup 506 and AWID block 510 (both described in more detail below) determine if the new AXI write request write data in FIFO 508 to correspond to an outstanding request of a context stored in memory 504, then the AXI Write Data, WID, and Write Strobes from bus 406 are popped from the W FIFO 508. Memory 504 also contains a per WTAG indexed Boolean status that indicates if the last beat of a context's write request write data has been received, and WID check block 506 takes this into consideration in order that PLB memory boundaries between request write data be conserved. Each pop of the W FIFO 508 reads one beat that had been transferred to the W FIFO from the AXI Write Data channel 406. The popped WID is used to lookup the WTAG index by matching the stored AWID. The AWC 502 maintains per WTAG current address and beat counters in memory 504 that are updated as each beat of data is popped from the FIFO 508. AWC logic (not shown) examines the current address counter, AXI LENGTH (AWLEN), and AXI SIZE (AWSIZE) encoded in the AXI write request on bus 408 to determine if it is appropriate to merge the Write Data and Write Strobe information from the current beat with that of previous beats into a common quad-word, or to allocate a new WTAG index.

A parity generator 507 calculates parity over the merged Write Data quad-word discussed above. The Write Data and corresponding parity are merged and written to the WB write data memory (WDM) 520 addressed by the WTAG index and the offset from a per-WTAG context pointer from memory 504. Similarly, the merged AXI write strobes associated with AXI write data in FIFO 508 are written to the WB Write Strobe Memory (WSM) 522. The PCC 540 sends a write command acknowledge to the WB 410 when it receives, via bus 529W, a combined response over channel 428. The write command acknowledge on bus 529W from PCC 540 includes a last write command done status as well as the WTAG index of the combined response. Also included on the bus 529W is the status as to whether the combined response indicates an acknowledge or an error response. The tapped pipe 509 monitors the write strobe portion of the write data from channel 406 for unacceptable write strobe patterns as defined in the AXI specification referred to above. AWC 502 combines illegal write strobe pattern status information and unacceptable on channel 408 write command requests to create bogus generated write command responses. The bogus responses are necessary in order to provide a means to respond to AXI Write requests on channel 408 for which there will be no corresponding complete PLB write command. AWC 502 arbitrates by interpolating bogusly generated write command responses between write command ack responses from PCC 540. AWC 502 combines the combined response error and WTAG index status information with the bogus responses to provide a formatted response to the B FIFO 512 for delivery to the AXI BRESP channel 426. The BID for the BRESP is looked up using the response WTAG index provided by the alternate sources PCC 540 or AWC 502 for use as an index, the PCC 540 as the source when the response is to be an "okay" (an acknowledged combined response), and the AWC 502 as the source when the response is to be a "slverr" (an errored combined response or an unsupported (bad) request).

The PWC 530 controls the PLB write data channel 412. For acknowledged PLB write commands, the PWC 530 loads the WTAG index for retrieval of the request corresponding to that command. The PWC 530 uses that WTAG index to retrieve the request information from per context registers 526 and memory 520, requests the PLB write data channel 412 and, when granted access, supplies that data to the PLB write data channel 412.

The PLB Command Control (PCC) block 540 issues commands over the PLB command channel 414 and receives responses on the PLB combined response channel 428. When the combined response indicates an read or write command acknowledgement from the PLB controller 404 over bus 428 has been received, a write command acknowledge on bus 529W is presented to the PLB Write Control (PWC) 502 for a write command, or a read command acknowledge on bus 529R to the Read Combined Response Logic block 582 for a read command, as appropriate. In addition, for a write, the WTAG index is passed to the WTAG_D FIFO 528 via bus 529W after a write command acknowledgement is received.

If the AXI requests a read transaction, but there is a PLB error, the AXI read data channel requires a response consisting of the number of beats requested, and an error response on channel 426 for each generated beat on channel 424. In response to the read command acknowledgement on bus 529R, a bogus beat generator 551 in the PRC block 550 generates dummy data for transmission to the AXI bus over channel 424.

The RTAG index (during a read) or the WTAG index (during a write) is sent to the PLB in a bit field of the PLB command over channel 414. The index is returned by the PLB on each PLB beat of the read data transfer burst on channel 422 for a read command. The PRC block 550 recovers the RTAG index and passes it into the read Data FIFO 584 along with the parity and the read data. The WTAG index for PLB write commands might not be returned by the PLB and, thus, might not be used. The bogus beat generator 551 also stuffs RTAG indexes for the bogusly generated beats into the FIFO 584. Because the PLB read data phase is not flow controlled and does not forgive overruns, an arbiter (not shown) multiplexes the bogus beats with the PLB beats. Thus the read data FIFO data stream can have interlaced beats that are bogus and not bogus. Also, because of splitting, read data from one AXI request might be fed to the PRC 550 immediately back-to-back following a portion of another AXI requests read data before either are complete. To handle this situation, the ARC 570 reads FIFO 584 and uses temporary RTAG indexes to look up the RID from the read request memory 574.

If the response on channel 428 is a retry response to a command, the PLB Timer Control (PTC) 560 will provide a pseudo-randomly determined delay period after which it will communicate to the PCC 540 that the command is to be retried.

The PLB hang Detect Control (PHC) block 534 provides a mechanism for ensuring forward progress on outstanding commands and otherwise asserts a hang detect signal. The PRC block 550 accepts valid data after bit swapping in block 552 from the PLB channel 422 in response to previously acknowledged read commands. The PRC 550 must be able to accept a beat of such previously requested data on every clock. This data may be stored in the RB 418, later to be retrieved by the ARC 570 and delivered to the AXI RDATA channel 424.

The PLB Write control (PWC) block 530 requests the PLB write data bus 412 after receiving a write command acknowledgement response through FIFO 528 or from a faster more direct path from the PCC 540 (not shown). When the PLB write data interface 404 grants the write data bus 412, the master must send a burst of write data stored in the write data memory 520. The PWC 530 posts write completion status over bus 532 to the AWC 502, which de-allocates the write request tag therein. Completion of delivery of a context's write data to the PLB channel 412 could be many clock cycles later than the write request terminating event that triggers the pushing of the BRESP to B FIFO 512. The WTAG indexed context thus may persists far longer than the write request.

The AXI Read Control (ARC) block 570 interfaces to the AXI slave read channels 416, 424, to accept requests, and communicates read channel data and responses to ARC 570. Clock domain crossing, rate adaptation, and some buffering are provided by the AR and R FIFOs in ARC 570 for the RADDR (416) and RDATA (424) read channels. The Read Request Memory 574 stores AXI Read Channel requests by RTAG-indexed entries. In this embodiment, memories 574 and 504 are indexed with values ranging from zero to fifteen. Thus both memories are divided into sixteen portions. Each portion of memory 574 represents a potential read request traffic context. In the read path, the RTAG index is associated with data received over channel 422. Thus, the RTAG index might change from beat-to-beat and may be intermingled with other read request PLB beats and bogusly-generated bad beats from PRC 550. Since PLB beats are quad-words, and AXI beats might be less than quad-words, the pipeline 578, when appropriate, repeats PLB data beats into the R FIFO 584, and uses the RTAG index to look up the RID from an array of ARIDs, using the RID Lookup sub-block in ARC 570 operating on information stored in memory 574. Also for each AXI beat, the AXI size and length is needed to generate a flag indicating the last beat of the burst is being proffered on channel 424. In addition, the parity of the PLB beats is checked in parity check block 579 and any parity errors are reported beat by beat in the response on bus 426 if parity checking is enabled. AXI read requests on channel 416 are effectively flow controlled by the RTAG reservation and ARID and RTAG vacancy checks within 576. If there is no vacancy in the RTAG memory 576, or a repeat ARID is detected, the AXI request is not popped from FIFO 572.

As will be explained in more detail in connection with FIG. 6, when a new read request is presented to the ARC 570, the vacancy status of the read request memory 574 is checked for a free RTAG index, and for the new command's ARID having been already present. If the ARID is already present, or if there are no free RTAGs, the request must wait in the AR FIFO 572 for the corresponding RTAG entry to be de-allocated.

The AXI Read Control (ARC) block 570 interfaces to the AXI slave read channels 416, 424 to accept read requests, read address and to deliver read data and read response status to the AXI bus 304. As explained in more detail below, the AR, and R FIFOs in ARC 570 provide clock domain crossing, rate adaptation, and some buffering for the RADDR (416), and RDATA (424) read channels. The Read Request Memory 574 stores AXI Read Channel requests by entries indexed by RTAG indexes from ARID and vacancy check block 576 operating on previously stored contexts in memory 574. The memory 574 may be implemented as a group of register bit, vector, and counter arrays and is a memory indexed, in this embodiment, with values ranging from zero to fifteen. Thus, the memory 574 is divided into sixteen portions. Each portion represents a potential read request traffic context comprising an AXI read request from channel 416, the beats of read data and the status and progress of the request channel 424. Different requests can simultaneously proceed through various pipeline states from clock cycle to clock cycle. As will be explained in more detail in connection with FIG. 6, when a new read request is presented to the ARC 570, the vacancy status of the read request memory 574 is checked by block 576 for a free RTAG index, and for the new command's ARID (comprising a command ID from an AXI request, one portion identifying the AXI master, the other portion used by the AXI master to distinguish one of its requests from another having been already present). If the ARID is already present, or if there are no free RTAG indexes, the request must wait in the AR FIFO 572 for the corresponding RTAG entry to be de-allocated. Read data is popped from 584 to the RDATA pipe 578. The RDATA pipe accommodates the smaller beat transfer sizes by repeating the quad-word sized beats popped from FIFO 584. The read request memory includes counters and state variable registers tracking the requests current address, beat count and per RTAG bit mapped valid status. The RDATA pipe 578 also generates the last beat of burst status as part of the burst response and detects request completion. Upon request completion the valid bit indexed by the RTAG of the previously admitted request is cleared making that RTAG value once again available. Quad-word beats popped from FIFO 584 can be interlaced and intermingled with other requests. The ARC RID lookup in block 576 uses the RTAG requests popped with each beat from FIFO 584 to index the requests ARID to obtain each beat's RID. Parity checking of each beat is performed by parity check block 579 as data enters the RDATA pipeline 578. If the beat's parity enable flag from FIFO 584 was set, and the parity check fails, each beat delivered to FIFO 586 will be marked as having a parity error ("slverr") rather than with an "okay" response. Also, beats bogusly generated by generator 551 will bear this error response marking having been so tagged when pushed into FIFO 584. The RTAG vacancy check mechanism in block 576 provides flow control as FIFO 584 is sized large enough to accommodate sixteen complete responses, this being necessary as channel 422 cannot otherwise be flow-controlled once PLB read commands have been issued from PCC 540.

The PLB typically operates at a higher clock rate than the AXI bus. Clock rate adaptation is performed in the AXI Write Control (AWC) 502 and AXI Read Control (ARC) 570 blocks. Much of the clock rate adaptation is handled by the various FIFOs in these blocks. Thus, most of the logic in the bridge 306 operates at the PLB clock rates.

Exemplary Read Operation of A2P Bridge 306

When a read command from the AXI bus 304 is received, the bridge 306 performs the following exemplary operations:

A. Read requests over the AXI Read Address (RADDR) channel 416 is buffered by a FIFO 572 and is loaded into the FIFO 572 if there is room to do so. If there is no room or, optionally, when the FIFO 572 is "almost full", the read request is not acknowledged by the ARC 570 to the requesting client via to the AXI bus 304.

B. The ARC 570 reads an entry from the AR FIFO 572 and compares its ARID to outstanding ARIDs in the RTAG memory 576. If there is no match, and a vacancy is available, a four bit RTAG index is assigned to the new request. Sixteen potential RTAG contexts each representing a complete AXI Read request can be accommodated. The Read Data FIFO Memory 584 is large enough to accommodate, in this embodiment, a maximum number of sixteen beats from PLB channel 422 for every read request's traffic burst.

C. The Read Request from the FIFO 572 is posted to the Read Request Memory 574. The request memory holds the ARID and other per RTAG context information (e.g., state variable and state counter information) associated with the AXI read request. This information is sent with the PLB read command and returned in the PLB combined response, and is used to associate PLB beats with AXI read requests and to use the RID lookup block 587 looking up RIDs and beat-by-beat context status from the RTAG-indexed read request memory 574.

D. The ARC 570 posts a read request to the RB RTAG_C FIFO 580.

E. The PLB Command Control (PCC) 540 reads entries an RTAG from the RTAG_C FIFO 580.

F. The PCC 540 presents the read command to the PLB Bus controller 404 via channel 414.

G. The PCC 540 receives the combined response from the Bus controller 404.

H. The PCC 540 updates the read combined response logic 582 with any one of "rsv" (an error condition that infrequently occurs), "ack" (acknowledge and accept the command), "retry" (PLB arbiter 404 in FIG. 4) indicates the system is not ready to accept the command at this time, command is rejected and needs to be retried), or "err" (error, command is rejected, no data tenure will occur).

For the combined responses of "rsv" or "err", a per RTAG status register must be marked with a bad status corresponding to the offending RTAG index. Although no PLB data tenure will occur, an error-flagged response to the AXI Response channel 424 must be generated. This marked bad status is passed along with other bad request status information to the bogus beat generator 551.

For combined responses of retry, PCC 540 pushes the RTAG index onto its retry FIFO (not shown). For combined response of acknowledge, the PCC 540 must update its RTAG indexed split status to indicate whether subsequent PLB read commands need to be generated to satisfy this RTAG indexed request entry.

I. The PRC 550 receives the read data from the PLB via channel 422 after bit reordering in swapper 552.

J. The PRC 550 copies the read data to the read data FIFO 584.

K. The RTAG information is updated by logic (not shown) in read buffer 418 on each beat of the read data burst from the PLB channel 422.

L. The ARC 570 transfers data and RTAG indexes from the read data FIFO memory to pipeline 578 in ARC 570.

M. Parity is checked in the R Data Pipeline 578. The ARC 570 uses the RTAG as an index to look up the Read ID (RID), a bit-field in the channel 424, and the other information stored at the RTAG index to the Read Request Memory 574 and per RTAG context state variables to properly format the bursts for delivery into the ARC R FIFO 586. When the burst is completely delivered to the R FIFO 586, the associated RTAG is de-allocated from RTAG memory 576. The ARC delivers the read data from the R FIFO 586 onto the AXI RDATA channel 424 in the same order as it was received from the PLB 310. In this embodiment, the AXI read data bursts on channel 424 could be interleaved since AXI transactions can be split into multiple PLB transactions.

Exemplary Write Operation of A2P Bridge 306

When a write command from the AXI bus 304 is received, the bridge 306 performs the following exemplary operations:

1. Write requests from the AXI Write Address (AXI WADDR) channel 408 are received by the AXI Write Control block (AWC) 502 and the requests are stored the AW FIFO 514. The AXI interconnect fabric 402 is controlled by logic within the AWC 502 that accepts address and control information into the AW FIFO 514 over channel 408 whenever there is room in that FIFO. The AWREADY signal, one of several control signals from the AXI WDATA channel 406, is asserted when there is room in the FIFO, but de-asserted when the FIFO is Almost Full.

2. The AWID and vacancy check block 510 in the AWC 502 reads an entry from the AW FIFO 514 and compares its AWID to outstanding AWIDs in memory 504. As will be explained in more detail in connection with FIG. 6, if there is no match and a vacancy is available, a four bit WTAG index entry in the WTAG-indexed memory 504 is assigned, reserving memory space in the Write Request memory 504, Write Data memory 520, Write Strobe memory 522, and STAG registers 526. Write Data Memory 520 is allocated in blocks large enough to accommodate the maximum AXI write data burst of sixteen beats.

3. The AWC 502 writes the request to the Write Request Memory 504. This includes a list of the AWIDs and other information from the AXI write request. The AWC 502 keeps track of per WTAG context state variables in local registers in the AWC 502. Here, a context comprises an AXI request on bus 408, a PLB command on bus 414, PLB and AXI data transfers over their respective buses, associated responses, TAGS, state variable registers, and how signals therein propagate through the various pipelines. A context commences with an AXI request and although the request terminates with an AXI response on channel 426, the context persists until completion of write data delivery on channel 412 and the AWC 502 is notified of the completion via bus 532. Thus, the write context may persist many clock cycles following the write request completion which terminates with the pushing of the BRESP to FIFO 512.

4. The AWC 502 receives Write data from the AXI Write Data (AXI WDATA) channel 406 and stores the data into the W FIFO 508. The Write Data (AXI WDATA) channel 406 is controlled by logic that accepts data into the FIFO 508 whenever there is room in the FIFO. The WREADY signal, a control signal included with the AXI WDATA channel 406, is asserted when there is room in the FIFO, but de-asserted when the FIFO is almost full.

5. The AWC 502 reads entries from the W FIFO 508 and compares the WID to the outstanding valid context AWIDs. If there is a match, the AWC uses that WID to lookup the beat's WTAG index. It then uses that WTAG index to access local state variable registers in the WID check block 506 for a merge operation. It posts the merged beat to the WB Write Data Memory 520 using the WTAG index and the WTAG indexed per context pointer register as the Write Data Memory Address.

6. When WLAST, a control signal originating from the AXI channel 406, has been popped from FIFO 508, the AWC 502 posts an entry from pipeline 509 to the WB WTAG_C FIFO 524 indicating that the last AXI beat on channel 406 has been received by FIFO 508.

7. The PCC 540 reads entries from the WB WTAG_C FIFO 524 to retrieve a WTAG index to the AXI Request and Data Memory 504. From the perspective of the PCC 540, this is a newly ready and available request for which a PLB command is to be issued, and has not been previously issued, split or retried. The PCC block 540 receives both read and write requests RTAG_C FIFO 580 and WTAG_C FIFO 524, respectively. The PCC arbiter 541 decides which if any request should be issued, and presents the request's tag to the command pipeline 542. The PCC pipeline 542 then issues commands to the PLB controller 404, and receives responses to those issued commands on the PLB Combined Response channel 428.

The PCC arbiter 541 chooses from several sources. New read and write requests are popped from either the RTAG_C FIFO 580 or the WTAG_C FIFO 524 respectively. Similarly, indices for read and write splits (where an AXI request cannot be accomplished with a single PLB command) are popped from either the r_splits or w_splits per tag bit mapped registers (not shown) in PCC 540. Commands which have been previously issued, but that need to be retried, are popped from a retry FIFO (not shown) in PCC 540. Alternately, a null tag can be selected if no command should be issued.

The PCC 540 uses the indices selected by the arbiter 541 to retrieve the request information from either the Read or Write request memory 574, 504, respectively. The command including generated address and byte enable parity is written to the PCC command pipeline 542.

When the PLB command channel 414 is ready, the PCC 540 delivers the command request over channel 414 and advances the pipeline 542. The PLB allows the bridge 306 to issue up to two commands for which combined responses have not been provided. The bridge 306 complies with this requirement using an up down credit counter (not shown) that is initialized to the number of allowed outstanding PLB commands and which counts down when the bridge 306 issues a command and up when a combined response is received. The credit counter is located in PCC 540.

The indices for each issued command are pushed into the PCC 540's response FIFO (not shown). When the combined response is received, an entry from the response FIFO is popped. The entry popped from the response FIFO thus represents the read or write request to which the command's combined response applies. The read bit indicates whether the tag represents a read or a write.

8. The PCC 540 presents a write command to the PLB controller 404 via channel 414. When the combined response from controller 404 indicates an acknowledgement over channel 428, and the acknowledged command was a write command, an entry is pushed into the WTAG_D FIFO 528.

9. The PCC 540 receives a combined response from the Bus controller 404 via channel 428.

10. When the final combined response for the request's last PLB command is received over channel 428, the PCC 540 sends the write response status and WTAG index value to the B FIFO 512 in AWC 502 via bus 513.

11. The BID lookup block 505 in AWC 502 uses the write response WTAG index (hereinafter "BTAG") to look up the BID, the AXI write response channel 426 identification number (ID) associated with the ID of the write command received over channel 408. The BTAG, is used to index the AWID from memory 504. The AWC 502 formats an AXI Write response, indicating that a write has been completed by the PLB controller 404, and stores it into the B FIFO 512.

12. AWC interface control logic (not shown) within AWC 502 delivers the AXI Write response from the B FIFO 512 to the AXI BRESP channel 426.

13. The PCC 540 updates the WB registers 526 with the PLB Slave Tag and PLB Slave ID for a valid combined response to the PLB command channel 414. It also enters the WTAG index into the WTAG_D FIFO 528. The slave tag is given to the bridge 306, as a PLB master, as part of the combined response on channel 428 to a write command. The slave tag originates in the slave (within PLB subsystem 310 in FIG. 4) targeted by the PLB master and is passed through the PLB Bus Controller 404 to the bridge 306. The bridge 306 provides the slave tag along with the data in the PLB write data transfer phase. This allows the target PLB slave to match the transferred data with the earlier command. The slave ID is given to the master as part of the combined response over channel 428 to a write command. This slave ID originates in the PLB controller 404. The bridge 306 provides this slave ID along with the data in the PLB write data phase, so that the PLB controller can route the write data to the correct target slave.

14. The PWC 530 reads the WTAG index from the WTAG_D FIFO 528, requests and is granted the PLB write data channel 412 and reads the Write Data Memory 520 and Write Strobe Memory 522 at the WTAG index for a beat-by-beat retrieval of stored and merged AXI Write Data in memory 520 and stored merged AXI Write Strobes and parity in memory 522. This information is, in the next step, transmitted to the PLB controller 404 over the PLB write data channel 412 after bit reordering in swapper 536.

15. The PWC 530 sends the burst to the PLB controller 404 over channel 412. When the PWC 530 completely delivers the last burst, it signals the AWC 502 via bus 532 to de-allocate the corresponding WTAG index in memory 504.

The PLB write data channel 412 includes control signals, write data, write data parity, slave ID (SID) and the slave tag (STAG). The SID and STAG accompany the write command's combined response acknowledge and are received from the combined response interface 414. The SID and STAG are stored to, and retrieved from, per context registers 526 in the WB 410. The SID is supplied with the PLB write data access request. The STAG is provided with each beat of data traffic sent over channel 412.

As described above, the above embodiment handles transactions (commands) from a source, such as the AXI bus, which uses a source ordering ID and satisfies each source transaction with one or more transactions on a destination, such as the PLB 310 (FIG. 4), which supports transaction retries. This embodiment allows a subset of the source ID bits (AWID) and the data being accessed by a transaction to be used to determine the order that destination transactions are issued. By not doing so, conflicting transactions from one or more AXI bus masters might cause overwriting of application-sensitive memory-mapped locations accessible through the PLB 310.

It is desirable that write request ordering is enforced using information, such as address and straddle status stored in register arrays (not shown) in memory 504, other than the AXI ID. The WID and BID values are looked up using the appropriate WTAG index to the AWID array in memory 504.

Additionally, the master portion of the AXI ID, unique to the master, may be considered separately from the transaction portion of the AXI ID, particularly if multiple requests are coming from a single AXI bus master. It may also be advantageous to consider AXI read and write request address straddling of cache line boundaries in the PLB when accepting or refusing a request.

As described herein and in one exemplary embodiment, the AWC 502 is able to take into consideration the candidate AXI request's beginning memory address (AXI address field), amount of data (from AXI Length and AXI Size fields) to determine if there is straddling of the 128 byte boundary requirement of the PLB, in addition to the AXI ID field, before a write tag is granted. Further, stored information derived from previously admitted AXI requests may also be taken into consideration, as well as the history of the progress (stored in progress counters in PHC 534) in processing those requests, e.g., the latency and number of retries (stored in retry counters (not shown) in PTC 560) of similar requests. A block diagram of an apparatus that provides the above-described functionality is shown in FIG. 6.

Figure 6:
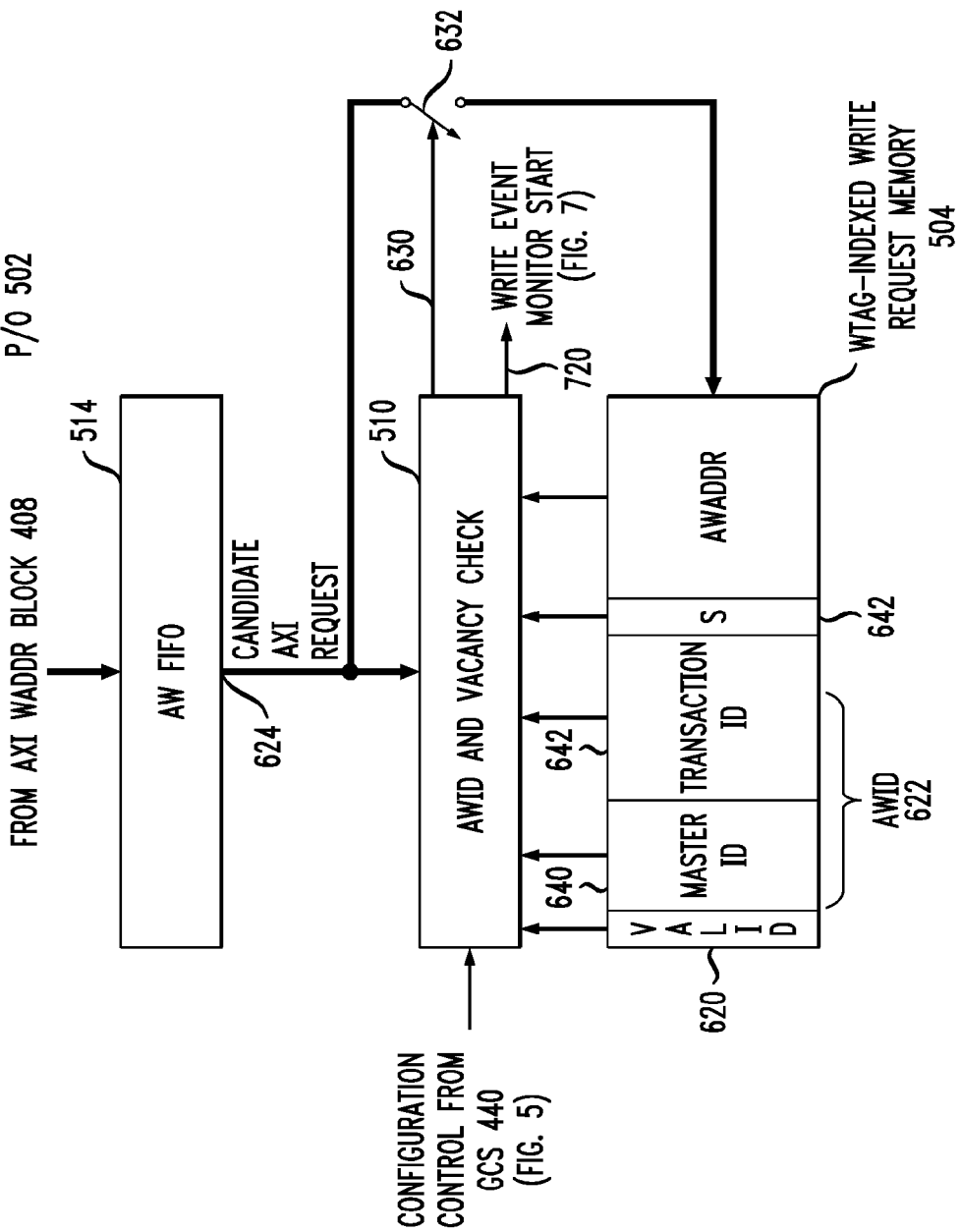
FIG. 6 shows a simplified block diagram of a block within the AXI-to-PLB bridge of FIG. 5, in accordance with embodiments of the present invention.

FIG. 6 shows a portion of the AWC 502 in FIG. 5. It desirable that the proper ordering of AXI write requests is verified before the write request are stored in the write request memory 504. For data coherency, write requests with the same AWIDs should be sent to the PLB controller 404 in the same order in which the requests were received and in the order in which the PLB write command sequences from PCC 540 are acknowledged from PLB controller 404. To do so, the AWC 502 preserves the ordering of writes by blocking new write requests that are within the same write request ID/Address region. In this embodiment, block 510 matches the AWIDs of previously admitted requests stored in memory 504 to AWIDs from candidate write requests from channel 406 and stored in FIFO 514. Thus, AXI write requests with the same AWIDs are completed sequentially in the order presented to AWC 502.

As described above in connection with FIG. 5, the AWID block 510 obtains a write request from the AW FIFO 514 and compares the AWID of the request with AWIDs 622 in the WTAG-indexed memory 504. If no match occurs and there is room in the WTAG-indexed memory 504, the AWID of the request is entered into the WTAG-indexed memory 504 and a corresponding "valid bit" 602 is set corresponding to the entered AWID. The AWID has both a master portion 640 and transaction portion 642 used for performance monitoring as described below in connection with FIGS. 7 and 8. The master portion 640 identifies the particular AXI master issuing the command, and the transaction portion 642 identifies a particular transaction from that AXI master.

As configured by control bits from the GCS 440, the AWID and vacancy check block 510 matches AWID and/or write address AWADDR of pending write requests at output 624 of FIFO 514 to AWIDs and AWADDRs for pending write requests in memory 504. Should no match occur and there is room in memory 504 (when at least one of the Valid bits 620 is not set), then output 630 pops the candidate request from the FIFO 514 and loads the candidate write request into the memory 504, illustrated by the closing of switch 632. Alternatively, the block 510 may be configured to match just the master portion 640 of the AWID 622.

Completion of a pending request's context is indicated by the corresponding Valid bit 620 at the WTAG position in the bit-mapped memory 540 not being set. Completion of requests is simultaneous with the pushing of an entry into B FIFO 512. However, the clearing of WTAG-indexed Valid bits 620 does not occur until delivery of write data to the PLB is complete.

Write requests that straddle 128-byte boundaries have a "Straddle" bit (S) 642 set. If a write request that straddles a 128-byte boundary is admitted (after all requests with the matching master ID have been satisfied and their WTAG released), the corresponding S bit 642 is sent and any subsequent request with the same Master portion 640 of the AWID 622 will be blocked because the corresponding S bit entry is set for the entry that matches that master ID. Here, the straddle check is implemented in hardware. If the value of an AXI request's width adjusted AWLEN (part of the AXI command sent over channel 408) is greater than the complement of the quad-word addressing portion of that same AXI request, AXADDR, then a straddle condition is declared. For example, should an AXI subsystem master in the AXI bus subsystem 304 (FIG. 4) vary the non-master portion of an AXI AWID it generates, write ordering is still desirable. If the master portion of the AXI AWID for the AXI master is specified, and there was an additional requirement that the configured master portion of the AXI AWID also be matched, other "non-offending" AXI subsystem AXI masters might be spared the performance penalty of unnecessarily blocked requests.

The foregoing discussion regarding candidate write requests processed by block 510 is also applicable to read requests received over channel 416 from the AXI subsystem 304 for processing by ARC 570. While not described in further detail herein, it is understood that the ARID and vacancy check block 576 functions substantially the same as the AWID and vacancy block 510, for candidate read requests in AR FIFO 572 prior to writing into buffer read request memory 574.

In an alternative embodiment, a set of DCR-accessible programmable application master ID registers can be optionally programmed with lists of master ID values, or ranges of master ID values that must also be matched when the transaction ID portion 642 of the AWID 622 is not considered. In addition, a set of DCR-accessible programmable application master ID registers (not shown) can be optionally programmed with lists of AXI address values, or ranges of AXI address values that must also be matched to satisfy a match.

Embodiments of the present invention also provide a method of sampling and accumulating transaction (command) performance data in the bus bridge 306. Performance monitoring capability is made available for both read and write transactions in the bridge 306 by using the existing hardware used in the AWC 502 for write command monitoring, and in the ARC 570 for read request monitoring. As shown in FIGS. 5 and 6, the AWID block 510 is used to recognize a portion of the ID of an AXI request. When a comparison between the portion of the AXI ID and a non-negative fixed value (i.e. zero) is satisfied, write event monitor start signal 720 is asserted, the entire AWID is stored in memory 504 and the AWC 502 may enable a performance monitoring that it ignores subsequent requests for start event triggering with the same AWID. Another comparison circuit in BID lookup block 505 that monitors the AXI response and triggers when it recognizes the AXI response ID matches that of the previously stored start event recognized request, and resets the AWC 502 to the non-blocking start event monitor state. For a write request, two signals, write event monitor start (720 in FIGS. 6 and 7) and write event monitor stop signal 722 (not shown in FIG. 5 but originates in block 505) each become asserted for one clock cycle corresponding to the event recognitions. As discussed below, these signals are monitored by a set of DCR channel-accessible statistics registers capable of latency measurements and more. Advantageously, the AWID block 510 initiates sampling of transactions by matching only a portion of the AXI ID of a transactions request, while using the entire ID to recognize the transaction's matching AXI response to terminate the sampling of a given transaction. Thus, the monitoring of the command is specific to the particular ID of the command, allowing for multiple commands to be pending and still provide reliable monitoring of a particular command.

Similarly, for read commands, a read event monitor start signal 716 (not shown in FIG. 5 but originates in block 576) is generated when the matching of a portion of the candidate request's ARID matches a non-negative fixed value (i.e. zero), while a read event monitor stop signal 718 (not shown but comes from block 578) is generated when the last entry in response to a read request is pushed to R FIFO 586 with an RID that matches the entire stored ARID of the request that served to commencement the monitoring. Alternation between the hunting-capture and counting/capture blocking state is essentially the same as described above for write requests.

It is understood that the non-negative fixed values used for matching against ARID or AWID fields may be programmable via, for example, the GCS 440 (FIG. 5).

Figure 7:
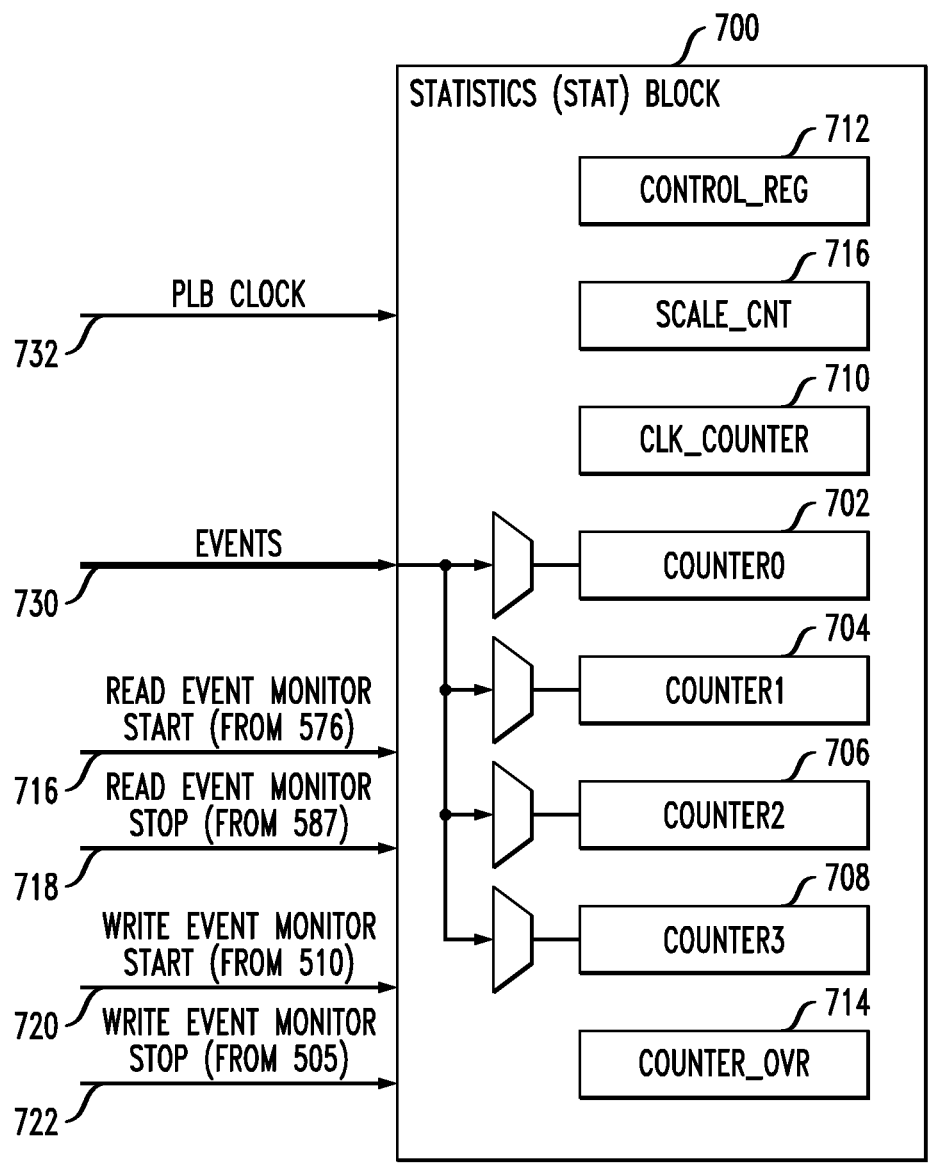
FIG. 7 shows a block diagram of a statistical data block in the AXI-to-PLB bridge of FIG. 4, in accordance with embodiments of the present invention.
Figure 8:
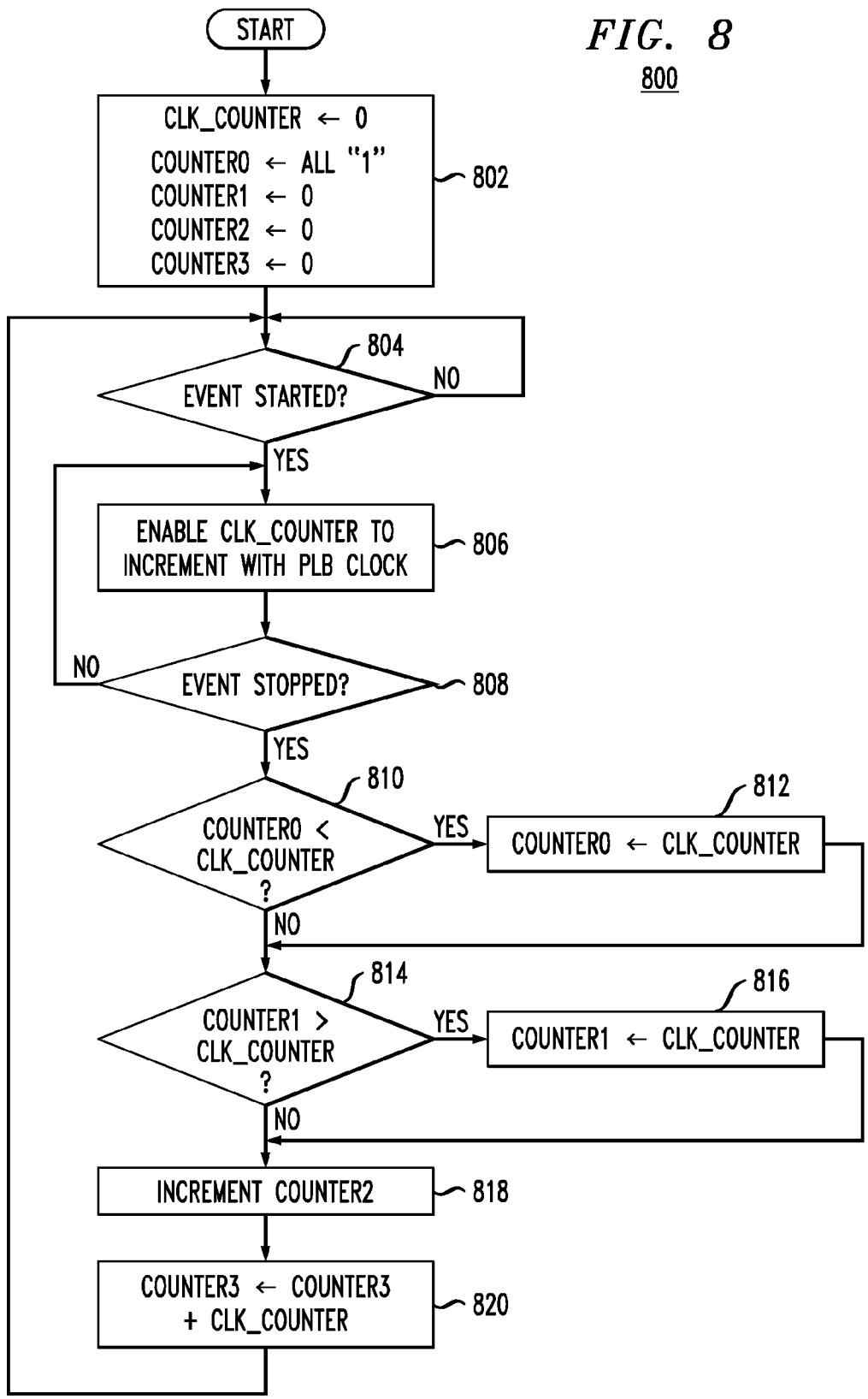
FIG. 8 is a simplified flow chart of initializing and operation of the statistical data block of FIG. 7.

As shown in FIG. 7, the statistics (STAT) block 700 provides a means for counting events and measuring the time intervals over which they occur. The STAT block 700 has seven DCR accessible registers. These include four general-purpose counters 702-708 that can count any of the pre-wired selectable external events, such as AXI read or write requests. The clk_counter 710 is adapted to count PLB clock cycles for use as a chronometric reference, for example. The five counters are provided with both read and write access via the DCR channel 434. Thus a command from the DCR subsystem 434 (FIG. 4) may preset or clear them. The control register 712 settings select the events to be counted and, as described below, controls what mode the counters 702-708 operate in. The control register 712 also controls the dynamic starting and stopping of the counters.

There are two main operational modes of the counters: counting mode and latency mode. In the counting mode, counting of the selected external events monitored over channel 730 may commence when an enable bit in the control register 712 is set. Counting can be halted by setting a halt counters bit in control register 712. Releasing the halt counters bit allows counting to continue. Counting is also halted when any of the counters 702-710 overflow, as discussed below.

In the latency mode, the interval between an AXI request with a selectable multi-bit ID field and a response with the same ID is measured by counting the number of clock cycles of clock PLB_clk 732, the PLB domain clock, between the request start event and the response stop event. In this embodiment, counter2 706 keeps track of the current latency, counter0 702 holds the maximum clock count historically observed by counter2 706 between start and stop events, and counter1 704 holds the minimum clock count historically observed by counter2 706 between start and stop events. When the latency mode is chosen, the control register's Write Latency bit (not shown) setting selects between measuring write latency or read latency. Writes to the control register 712 with the latency bit set resets the clock counter 710, counter0 702, counter 1 704, counter2 706, and counter3 708. In this embodiment, counter0-counter3 can be used for other selectable events or purposes, such as counting events over bus 730 and for diagnostic and performance measurement.

The counter_OVR register 714 contains the overflow bits for the five counters 702-710 indicating if one or more of the five counters overflows. As mentioned above, if one or more of the overflow bits become set, the counting by all the registers 702-710 halts. Register 714 can be read, but not written, over the DCR channel 434. The overflow bits in register 714 can be cleared by writing a "zero" to the enable bit in control register 712, followed by writing a "one" to the enable bit. The Scale_cnt counter 716 is an internal counter that counts on PLB clock cycles. It can be used to scale the clk_counter 710. A non-zero "scale" bit field in the control register 712 selects the scaling which divides the PLB clock by an exemplary eight, thirteen, or sixteen. Otherwise the value of the clk_counter 710 is unscaled. In this embodiment, the counter 716 is not readable via the DCR channel 434.

For the read latency mode, a read event monitor start signal 716 (not shown in FIG. 5 but originates in block 576) is generated when the matching of a portion of the candidate request's ARID matches a fixed value (i.e. zero), while a read event monitor stop signal 718 (not shown but comes from block 587) is generated when the last entry in response to a read request is pushed to R FIFO 586 with an RID that matches the entire stored ARID of the request that served to commencement the monitoring. Similarly, for write latency mode, a write event monitor start signal 720, originating in block 510 as shown in FIG. 6, is generated when the matching of a portion of the candidate request's AWID matches a fixed value (i.e. zero) when the request is entered into memory 504, as described above in connection with FIG. 6, while a write event monitor stop signal 722 (not shown but comes from block 505) is generated when a write request acknowledgment, having a BID that matches the entire stored AWID of the request that served to commence the monitoring, is pushed into B FIFO 512.

The measured latency intervals apply to the PLB domain and do not include the latency of the AXI interface clock crossing the various FIFOs in the AWC 502 and ARC 570 (FIG. 5). The blocking feature described above in connection with FIG. 6 advantageously prevents the re-occurrence of an additional monitoring process start event (e.g., a read or write request with the same ID) until a stop event has occurred.

After at least one start/stop event cycle has been completed (counter3 708 will have a non-zero value), these hardware registers will contain the data necessary for an external processor host or a processor internal to the network processor 100 (e.g., one or more of the processor cores $114_1$-$114_M$ to compute at least the following statistics about the latency seen by the event:
1) Minimum Latency (counter0 702)
2) Maximum Latency (counter1 704)
3) Number of transactions (counter2 706)
4) Total latency (counter3 708)
5) Average Latency (counter3/counter2)

Operation of the statistics block 700 is illustrated in simplified flowchart 800. To initialize the counters in statistics block 700, in step 802 all of the counters except counter0 702 are set to zero, counter0 being set to all ones. In step 806, when the statistics block 700 receives an event monitoring process start signal (e.g., a monitoring an AXI request, such as a read or write, based the request's multi-bit ID as described above) starts in step 804, the clk_Counter 710 is incremented in response to the PLB clock. Until the event stops in step 808, step 806 is repeated. When the event stops, such as upon transmission of a AXI BRESP on channel 426 having the same ID as the AXI request that initiated the event in step 804, the monitoring process stops and data regarding the monitored event is determined beginning with step 810. In step 810, the value of counter0 702 is checked to see if it is less than the value in clk_counter 710. If so, then in step 812, then the value of clk-counter 710 is loaded in to counter0 702 and control passes to step 814. Otherwise, control passes to step 814 where the value of counter1 704 is checked against the value in clk_counter 710. If the value in counter 1 is greater than that in clk_counter 710, then in step 816 the value of clk_counter is loaded into counter1 and control passes to step 818. Otherwise, control passes to step 818 where counter2 706 is incremented and in step 820, the value of counter3 708 is increased by the value of clk_counter 710 and control waits until another event occurs in step 804. It is understood that one or more of the steps described in connection with FIG. 8 may be skipped or not implemented, and other steps added, as desired.

While AXI and PLB buses are used in the above-described embodiment, it is understood that the bridge 304 may interface other bus types with similar characteristics to the AXI and PLB buses. For example, one of the primary characteristics of the AXI bus is that reads and writes are separate and ordering requirements are normally defined by the ID bits. The primary characteristics of PLB, relative to AXI, are the retry mechanism and the difference in data alignment and size of memory access requests.

While the exemplary embodiments of the present invention have been described with respect to processing blocks in a software program, including possible implementation as a digital signal processor, micro-controller, or general-purpose computer, the present invention is not so limited. As would be apparent to one skilled in the art, various functions of software might also be implemented as processes of circuits. Such circuits might be employed in, for example, a single integrated circuit, a multi-chip module, a single card, or a multi-card circuit pack.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

It will be further understood that various changes in the details, materials, and arrangements of the parts which have been described and illustrated in order to explain the nature of this invention might be made by those skilled in the art without departing from the scope of the invention as expressed in the following claims.

The invention claimed is:

1. In a system, a method of monitoring execution of commands by a subsystem, comprising:
   A) receiving a command having an identification field associated therewith;
   B) storing the command and the associated identification field in a memory;
   C) transmitting the stored command to the subsystem for execution;
   D) comparing at least a portion of the received identification field to a non-negative integer value and, if there is a match, then:
      D1) beginning a monitoring process;
      D2) waiting for a response from the subsystem, the response having an identification field; and
      D3) stopping the monitoring process when the response identification field matches the stored identification field.

2. The method of claim 1, wherein the non-negative integer is programmable value.

3. The method of claim 2, wherein the monitoring process is a timer responsive to a clock in the subsystem.

4. The method of claim 1, wherein the identification field comprises a master portion concatenated with a transaction portion and, in step D), the non-negative integer value is compared to the master portion of the identification field.

5. The method of claim 1, further comprising the step of sending data associated with the monitored process to processor.

6. The method of claim 1, wherein steps B) and C) are not performed when the received identification field matches one or more identification fields stored in the memory.

7. The method of claim 6, wherein steps B) and C) are performed once all identification fields stored in the memory that match the received identification field are removed from the memory.

8. The method of claim 1, wherein the steps are implemented in a bridge circuit coupled between a first bus and a second bus, the memory is located in the bridge, the command is issued from a source coupled to the first bus, and the command is executed by the subsystem coupled to the second bus.

9. The method of claim 8, wherein the first bus is an AXI-compatible bus and the second bus is a PLB-compatible bus.

10. The method of claim 8, wherein the bridge circuit is a slave on the first bus and a master on the second bus.

11. The method of claim 1, wherein the monitoring process comprises the steps of:
   E1) determining a minimum latency of executed commands previously monitored;
   E2) determining a maximum latency of executed commands previously monitored;
   E3) determining a total latency of executed commands previously monitored; and
   E4) determining a number of executed commands previously monitored.

12. The method of claim 11, wherein the minimum latency, maximum latency, total latency, and the number of executed commands monitored as determined in steps E1)-E4) are sent to a processor and the processor determines the average latency of the commands previously executed by dividing the total latency by the number of commands monitored.

13. The method of claim 11, wherein in the steps of determining the minimum latency, maximum latency, and total latency, latency is determined by a timer responsive to a clock from the subsystem.

14. In a bridge circuit coupled between a first bus and a second bus, a method of monitoring execution of commands by a subsystem coupled to the second bus, comprising:
   A) receiving, from the first bus, a command having an identification field associated therewith;
   B) storing the command and the associated identification field in a memory;
   C) transmitting the stored command to the subsystem for execution;
   D) comparing a first portion of the received identification field to a non-negative integer value, and if there is a match, then:
      D1) starting a timer;
      D2) waiting for a response from the subsystem, the response having an identification field; and
      D3) stopping the timer when the response identification field matches the entire stored identification field.

15. The method of claim 14, further comprising the steps of:
   determining a minimum latency of executed commands previously monitored;
   determining a maximum latency of executed commands previously monitored;
   determining a total latency of executed commands previously monitored; and
   determining a number of executed commands previously monitored;
   wherein in the steps of determining the minimum latency, maximum latency, and total latency, latency is determined by a timer, the timer being responsive to a clock from the subsystem.

16. A system for monitoring execution of commands by a subsystem, comprising:
   a receiver, coupled to a first bus, adapted to receive a command having an identification field associated therewith;
   a memory, coupled to the receiver, for storing the command and the entire associated identification field;
   a transmitter, coupled to the memory and a second bus, adapted to transmit the stored command to the subsystem for execution;
   a comparison circuit, coupled to the receiver, adapted to compare at least a portion of the received identification field to a non-negative integer value to thereby determine if there is a match;
   a time-based monitoring circuit responsive to the comparison circuit;
   wherein if there is a match by the comparison circuit, then: enabling the monitoring circuit.

17. The system recited in claim 16, further comprising:
   an additional receiver, coupled to the second bus, adapted to receive a response from the subsystem, the response having a response identification field;
   an additional comparison circuit, coupled to the additional receiver and the memory, adapted to compare the response identification field to the entire identification field stored in the memory to thereby determine if there is a match;
   wherein if there is a match by the additional comparison circuit, then disabling the monitoring circuit.

18. The system recited in claim 16, wherein the monitoring circuit comprises a plurality of counters, at least one of which, when the monitoring circuit is enabled, to count in response to a clock from the subsystem.

19. The system recited in claim 17, wherein a first one of the plurality of counters stores a minimum latency of executed commands previously monitored, a second one of the plurality of counters stores a maximum latency of executed commands previously monitored; a third one of the plurality of counters stores a total latency of executed commands previously monitored; and a fourth one of the plurality of counters stores a count of executed commands previously monitored.

20. The system recited in claim 19, further comprising a processor adapted to calculate an average latency of the commands previously executed by dividing the total latency by the number of commands monitored.

* * * * *